(12) United States Patent
Lau et al.

(10) Patent No.: US 12,331,618 B2
(45) Date of Patent: Jun. 17, 2025

(54) SYSTEM AND METHOD FOR CARBON DIOXIDE STORAGE AND GEOTHERMAL HEAT MINING IN DEPLETED GAS, GAS CONDENSATE OR OIL RESERVOIRS

(71) Applicant: Low Carbon Energies LLC, Bellaire, TX (US)

(72) Inventors: Hon Chung Lau, Bellaire, TX (US); Kai Zhang, Calgary (CA)

(*) Notice: Subject to any disclaimer, the term of this patent is extended or adjusted under 35 U.S.C. 154(b) by 0 days.

(21) Appl. No.: 18/144,705

(22) Filed: May 8, 2023

(65) Prior Publication Data
US 2023/0358120 A1 Nov. 9, 2023

Related U.S. Application Data

(60) Provisional application No. 63/339,336, filed on May 6, 2022.

(51) Int. Cl.
*E21B 43/16* (2006.01)
*E21B 41/00* (2006.01)

(52) U.S. Cl.
CPC ........ *E21B 41/0064* (2013.01); *E21B 43/164* (2013.01)

(58) Field of Classification Search
CPC ............ E21B 41/0064; E21B 41/0057; E21B 41/005; E21B 43/16; E21B 43/162; E21B 43/164; E21B 43/166; E21B 43/168
See application file for complete search history.

(56) References Cited

U.S. PATENT DOCUMENTS

| | | | | |
|---|---|---|---|---|
| 8,991,510 B2* | 3/2015 | Saar | ...... | F24T 10/20 |
| | | | | 166/402 |
| 2008/0133194 A1* | 6/2008 | Klumpen | ...... | G01V 20/00 |
| | | | | 703/10 |

(Continued)

FOREIGN PATENT DOCUMENTS

WO WO-2010149953 A2 * 12/2010 ......... E21B 41/0064

OTHER PUBLICATIONS

Hook et al., Decline and depletion rates of oil production: a comprehensive investigation, 2014, Phil. Trans. R. Soc. A, 372, 210120448 (Year: 2014).*

(Continued)

*Primary Examiner* — Angela M DiTrani Leff
(74) *Attorney, Agent, or Firm* — Phillip Blacke; Dossey & Jones PLLC

(57) ABSTRACT

A method for storing $CO_2$ includes identifying a depleted or partially depleted gas, gas condensate or oil reservoir having a plurality of injection wells and a plurality of production wells. The reservoir is then depleted. Once the reservoir is depleted or partially depleted, enhanced oil recovery and/or enhanced gas recovery is then performed on the reservoir where a first quantity of carbon dioxide is injected into the plurality of injection wells to displace the remaining oil and gas. Heat mining is then performed on the reservoir, where the second quantity of carbon dioxide is injected into the reservoir and the first and second quantities of carbon dioxide are subsequently produced to the surface for capture and conversion of geothermal heat of the first and second quantities of carbon dioxide into electricity. A third quantity of carbon dioxide is then injected and stored in the reservoir permanently.

8 Claims, 40 Drawing Sheets

(56) References Cited

U.S. PATENT DOCUMENTS

2012/0067568 A1\* 3/2012 Palmer ................. E21B 43/164
　　　　　　　　　　　　　　　　　　　　　　166/402
2020/0347707 A1\* 11/2020 Bowdon ................ E21B 41/00
2021/0025265 A1\* 1/2021 Randolph ............. E21B 43/164

OTHER PUBLICATIONS

Afidick et al., Production Performance of a Retrograde Gas Reservoir: A Case Study of the Arun Field, 1994, SPE 28749 (Year: 1994).\*

\* cited by examiner

SYSTEM AND METHOD FOR CARBON DIOXIDE STORAGE AND GEOTHERMAL HEAT MINING IN DEPLETED GAS, GAS CONDENSATE OR OIL RESERVOIRS

FIELD OF THE INVENTION

The disclosure relates generally to carbon dioxide storage, and more specifically to storing carbon dioxide and heat mining in a depleted gas, gas condensate or oil reservoir.

BACKGROUND OF THE INVENTION

The Paris Agreement has set a long-term goal to limit global warming to below 2° C., preferably to 1.5° C. above pre-industrial times. $CO_2$ is a greenhouse gas, which is released from the combustion of fossil fuels. Capturing the emitted $CO_2$ and storing it permanently in a subsurface reservoir, commonly known as carbon capture and storage (CCS), is an important technology for reducing anthropogenic $CO_2$ emission. In some industries, such as cement production, refineries, iron and steel, and petrochemical, it is difficult to avoid the $CO_2$ emission without CCS. An exemplary reservoir that can be utilized in conjunction with CCS includes gas condensate reservoirs.

A specific example of a depleted gas condensate reservoir is the Arun gas condensate field is located in the Aceh province of North Sumatra, Indonesia, approximately 10 km away from the coast. It was discovered from the Arun-1 well drilled by Mobil Oil Indonesia in late 1971. The Arun carbonate reservoir is approximately 4.8 km wide and 16 km long at a buried depth of 10,000 ft. It has an average net pay of 503 ft and an initial-gas-in-place (IGIP) of 16.8 Tcf and an initial-condensate-in-place (ICIP) of 840 million barrels (MMbbl). The ultimate recovery is expected to be 94% of IGIP and 87% of ICIP.

The reservoir was developed with four producing clusters. After condensate separation, the produced gas was reinjected into the reservoir for pressure maintenance. Field production was ramped up until a maximum condensate production rate of 130,000 barrels per day (bpd) was reached in 1989 and a maximum gas production rate of 3,500 million standard cubic feet per day (MMscf/d) was reached in 1995.

The Arun wells were equipped with 10,000 pounds per square inch (psi) working pressure stainless-steel wellheads to resist corrosion and erosion from high-pressure and high-temperature production fluid including $CO_2$ and $H_2S$. Each production cluster was equipped with a compressor plant for gas re-injection and a power plant. The interconnected pipeline delivered the gas and condensate to the LNG facility. In addition, each cluster was equipped with mud tanks, gas exchangers, cluster separators, pumps, a battery room, flare pits, pipe racks, produced water, a condensate recovery system, etc. The Arun gas field was suspended in 2015 when the West Texas Intermediate (WTI) dropped from $105/barrel of oil (bbl) to $37/bbl. About 13% of ICIP (109 MMbbl) remained in the field at shut-in. Moreover, the Arun reservoir had a relatively high temperature of 351° F. (178° C.) at the datum of 10,050 ft.

Large geothermal resources are also available in the Arun reservoir, as the Arun gas reservoir covers an area of 23,240 acres. The $CO_2$ can be used for enhanced gas recovery (EGR) as a working fluid to extract geothermal heat for electricity generation. It can also be geologically stored. There are several reviews on $CO_2$ EGR and sequestration, experiment studies on $CO_2$ storage, numerical studies on $CO_2$ EGR, $CO_2$ storage, $CO_2$ heat mining, and analytical studies on $CO_2$ heat mining. Additionally, some researchers have conducted field scale reservoir simulations on $CO_2$ EGR and $CO_2$ storage. The field models, however, are not history matched with field production and pressure data.

BRIEF SUMMARY OF THE INVENTION

The disclosed subject matter provides a method for storing carbon dioxide. The method includes identifying a depleted gas condensate reservoir including a plurality of injection wells and a plurality of production wells. Once the reservoir is identified, the reservoir is allowed to deplete by pressure depletion or by produced gas-reinjection. Enhanced gas recovery is then performed, where, during the performing, a first quantity of carbon dioxide is injected into the plurality of injection wells for expulsion of gas, gas condensate, and/or oil existing in the reservoir. Once the production of the gas, gas condensate, and/or oil is performed, heat mining of the reservoir is performed, where, during the heat mining, a second quantity of carbon dioxide is injected into the reservoir and subsequently produced to the surface for capture and conversion of geothermal energy of the first and second quantity of carbon dioxide into electricity. After geothermal electricity generation, the produced first and second quantity of carbon dioxide is reinjected into the reservoir to extract more heat and is produced for geothermal electricity generation. The process is continued for a period of time. After the desired geothermal energy is extracted, the first, second, and a third quantity of carbon dioxide are then stored in the reservoir, where, during the storing, all of the plurality of production wells are shut-in and the first, second, and third quantities of carbon dioxide are injected into the reservoir for permanent storage.

In an additional embodiment, which can be combined with the previous embodiment, the heat mining includes reinjecting the first quantity of carbon dioxide and producing the first quantity of carbon dioxide over a period of time.

A system is further provided for storing carbon dioxide. The system includes a depleted reservoir including a plurality of injection wells and a plurality of production wells. A plurality of horizontal zones of the reservoir are each defined at a specific depth and each include a specific horizontal permeability. The carbon dioxide is configured to be injected into the reservoir via at least one of the plurality of injection wells. A bottomhole pressure limit of each of the plurality of injection wells are set to an initial reservoir pressure.

An additional method for storing carbon dioxide is further provided. The method includes providing an at least partially depleted gas condensate reservoir including a plurality of injection wells and a plurality of production wells. Once the depleted gas condensate reservoir is provided, during a first phase, enhanced gas recovery is then performed, where a first quantity of carbon dioxide is injected into the depleted gas condensate reservoir for expulsion of gas and gas condensate existing in the reservoir. Then, during a second phase, heat mining is performed, where a second quantity of carbon dioxide (larger than the first quantity) is injected into the reservoir and the first and second quantities of carbon dioxide are subsequently produced for capture and conversion of geothermal heat of the quantity of carbon dioxide into electricity. During a third phase, storage is performed, where the first, second, and a third quantity of carbon dioxide (larger than the first or second quantities) is injected into the reservoir until a pressure of the depleted gas condensate reservoir reaches an initial reservoir pressure.

BRIEF DESCRIPTION OF THE DRAWINGS

The disclosed subject matter, objectives, and advantages thereof, will best be understood by reference to the following detailed description of an illustrative embodiment when read in conjunction with the accompanying drawings, wherein.

DETAILED DESCRIPTION

Figure 1:
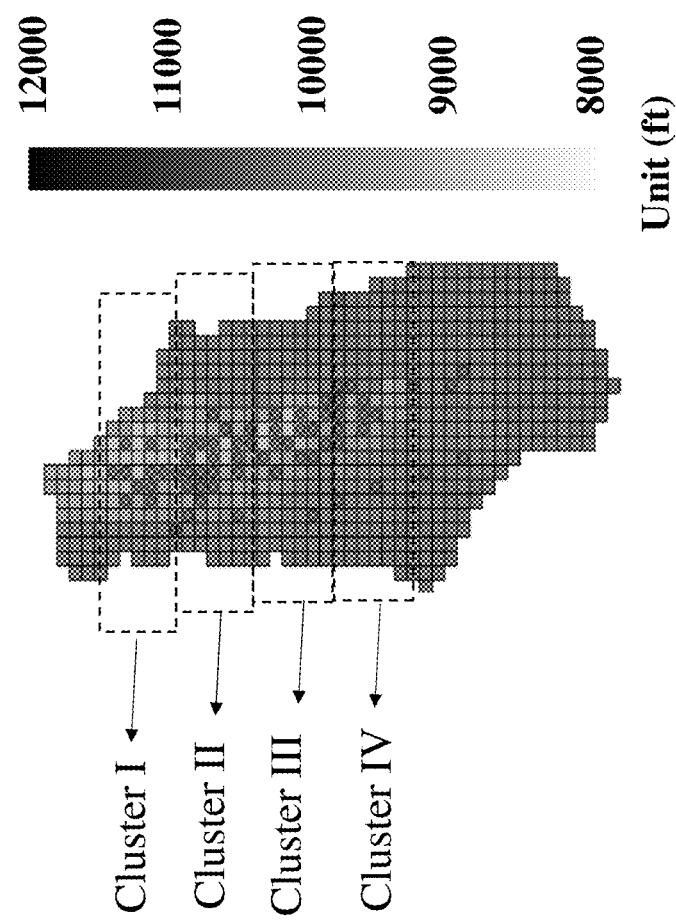
FIG. 1 displays a top view of a reservoir grid of a top formation of a simulation model of a reservoir, in accordance with embodiments.

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It is noted that $CO_2$ injection into the depleted Arun reservoir can produce 51 MMbbl of condensate over a period of 16 years. Afterwards, continuous $CO_2$ injection without any production can provide for the storage of 1.2 billion tons (Gt) of $CO_2$ over a 20 year period by raising the reservoir pressure to the initial value. In addition, subsequent recycling $CO_2$ can produce substantial amount of geothermal energy for electricity production.

In the disclosed embodiments, $CO_2$ can be stored in a gas condensate reservoir and can additionally be utilized as a tool for heat mining in conjunction with the gas condensate reservoir. Once a gas condensate reservoir has become depleted, a three phase process may be performed utilizing a quantity of $CO_2$. In a first phase, $CO_2$ enhanced gas recovery is performed, where injection wells and production wells are both utilized. During the enhanced gas recovery phase, $CO_2$ (a first quantity) is injected into the reservoir via the injection wells and the remaining gas and gas condensate that was in the reservoir is expelled from the reservoir via the production wells. In a second phase, $CO_2$ heat mining is performed, where a portion of the production wells are converted to injection wells to increase the quantity and injection rate of $CO_2$. During the heat mining phase, $CO_2$ (a second quantity) is injected into the reservoir via the injection wells. The pressure change in the reservoir causes the $CO_2$ to become heated and the heated $CO_2$ is produced from the production wells. The geothermal heat from the heated $CO_2$ is subsequently captured and converted to electricity via a heat converting system (such as, for example, a turbine and electric generator). Once the heat of the $CO_2$ has been extracted, the $CO_2$ is then reinjected into the reservoir via the injection wells. In a third phase, $CO_2$ storage is performed, where all production wells are converted to injection wells. $CO_2$ (the first quantity, the second quantity, and a third quantity) is injected into the injection wells until the reservoir pressure reaches an initial reservoir pressure.

It is noted that, in embodiments, the second quantity of $CO_2$ may be larger than the first quantity of carbon dioxide and the third quantity of $CO_2$ may be larger than the first quantity or the second quantity of $CO_2$.

In an embodiment, during the heat mining, hot carbon dioxide is produced to the surface and heat is extracted from the produced carbon for generating steam or a high pressure vapor for electricity generation.

It is noted that, in embodiments, the third phase ($CO_2$ storage) can be performed prior to the second phase ($CO_2$ heat mining). When this process is carried out in some cases, the storage helps to build up the reservoir pressure and a larger heat mining rate can be achieved (and more heat mined overall) than if the $CO_2$ storage is carried out after the $CO_2$ heat mining.

Reservoir Simulation

In the disclosed embodiments, a fieldwide geological model of the Arun reservoir is constructed. The reservoir model is history matched against historic production and reservoir simulations are performed to investigate EGR, heat mining, and $CO_2$ storage ability. Economic analysis is also conducted to determine the profitability of these processes. It is noted that the methodologies and systems presented are applicable to other reservoirs besides the Arun that include similar metrics to the Arun reservoir. For example, The Arun is an example for a depleted gas condensate reservoir however, the same procedures can also be used for a gas and/or oil reservoir.

The reservoir model, in embodiments, is built using the CMG composition simulator. The simulator is configured to solve the mass balance and Darcy's law for the water, gas, and oil phases. The thermodynamic equilibrium of oil and gas phases is governed by the Peng-Robinson Equation of State. Reservoir parameters are given in Table 1.

TABLE 1

Reservoir parameters of the Arun gas reservoir
Reservoir parameters

| | |
|---|---|
| Area (acres) | 23,240 |
| Mean depth (ft) | 10,050 |
| Net pay (ft) | 495 |
| Porosity (%) | 16.1 |
| Initial reservoir pressure (psi) | 7,115 |
| Initial reservoir temperature (° F.) | 351 |
| Initial water saturation (%) | 10.7 |
| Initial-gas-in-place (Tcf) | 16.8 |
| Initial-oil-in-place (MMbbl) | 840 |

The buried depth of the formation top of the simulation model is shown in FIG. 1, where high structure is represented by shading on the bottom end of the scale and low structure is represented by shading on the top end of the scale. As shown, the shading in the top middle of the model presents high structure while gradually lower structure is presented outside of that area.

In the embodiment, the Arun reservoir model includes 3,380 grids to cover 23,240 acres of productive area. A total of 38 years (1977 to 2015) of production history is history-matched. Every grid block in each layer has a dimension of 500 m in the x-direction and 500 m in the y-direction. It is noted that the reservoir embodies 5 vertical layers and contains 65 producers and 12 injectors. From top to bottom, the formation includes five zones with varying horizontal permeabilities as shown in Table 2 and FIG. 2. The ratio of the vertical permeability and the horizontal permeability is set to 0.1.

TABLE 2

Reservoir horizontal permeability from top to bottom
Reservoir permeability in millidarcies (md)

| | |
|---|---|
| Zone 1 | 51.5 |
| Zone 2 | 131 |
| Zone 3 | 15 |
| Zone 4 | 6.7 |
| Zone 5 | 1.2 |

Figure 2:
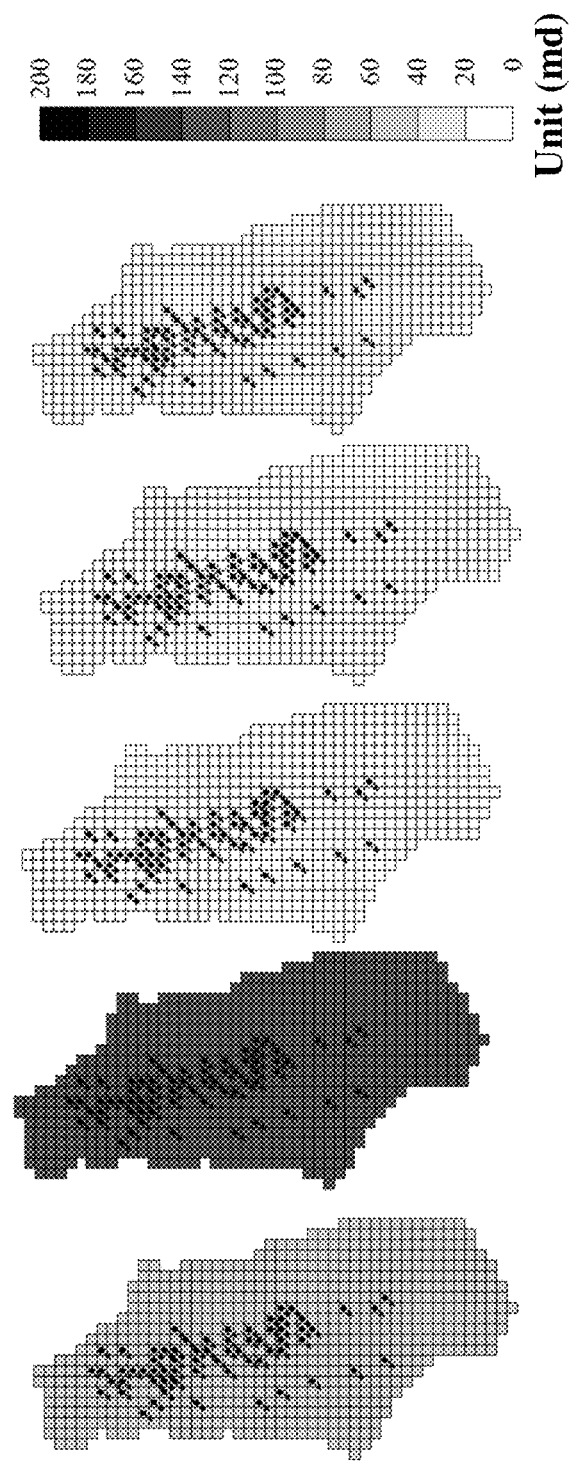
FIG. 2 displays a top view of zones/layers of a reservoir model having varying horizontal permeabilities, in accordance with embodiments.
Figure 3:
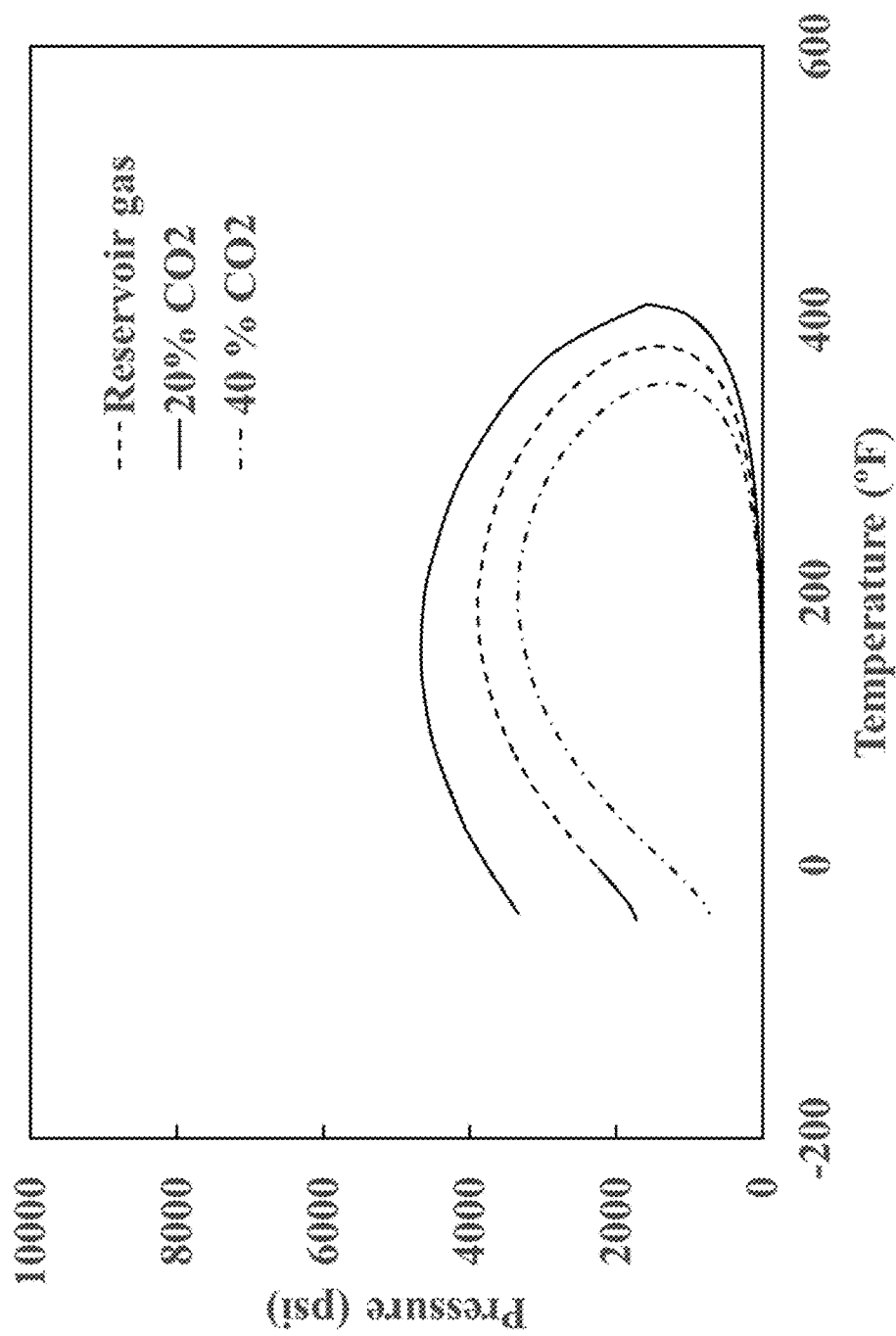
FIG. 3 displays a graphical presentation of a phase envelop of reservoir gas and a mixture of reservoir gas and $CO_2$, in accordance with embodiments.

As shown in FIG. 2, the shading of the second zone from the left signifies high permeability, the shading of the first zone on the left signifies medium permeability, and the shading of the rightmost three zones to the right signifies low permeability. Reservoir fluid phase behavior is characterized by the Peng-Robinson equation of state. The Arun condensate gas phase envelop with different $CO_2$ mixtures is shown in FIG. 3, where the outermost solid line represents the phase envelop of the reservoir gas while the middle and innermost lines represent the phase envelop when $CO_2$ is mixed with the reservoir gas. The two-phase region decreases when more $CO_2$ mixes with the Arun gas.

The reservoir gas and injected gas compositions are shown in the Table 3. Water exists in the gas phase at reservoir conditions because of the high reservoir temperature. The injected gas contains more $CH_4$ and less heavy hydrocarbon components than the reservoir gas. Injected gas originates from the produced gas after the condensation is separated at the surface.

TABLE 3

Reservoir gas components

| Reservoir gas components, (mole fraction %) | |
|---|---|
| $H_2O$ | 5.9 |
| $CO_2$ | 13.76 |
| $N_2$ | 0.32 |
| $C_1$ | 67.3 |
| $C_2$-$C_7$+ | 12.7 |
| Injected gas composition (mole fraction %) | |
| $CH_4$ | 75 |
| $CO_2$ | 15 |
| $C_2H_6$ | 5.5 |
| $C_3H_8$ | 2.2 |
| $C_4$+ | 2.2 |

Figure 4B:
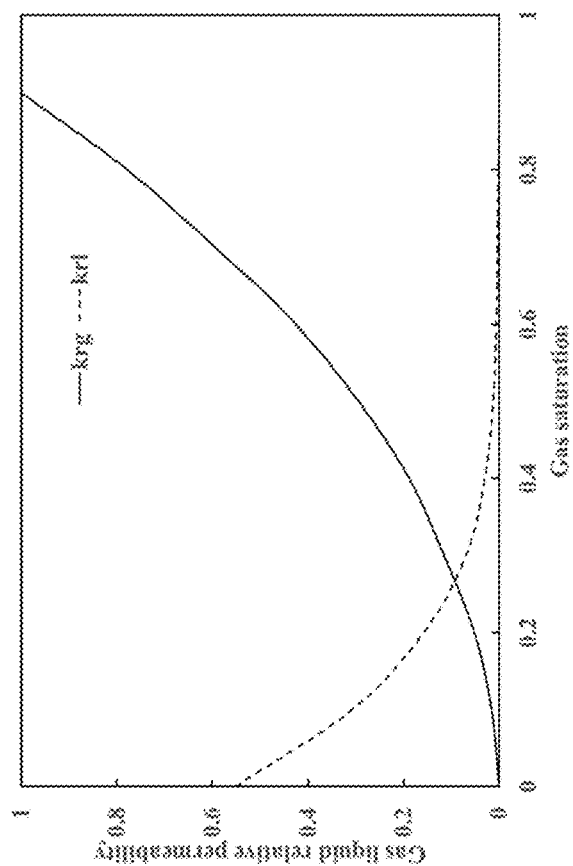
FIG. 4B displays a graphical presentation of a gas-liquid relative permeability model in accordance with embodiments.
Figure 4A:
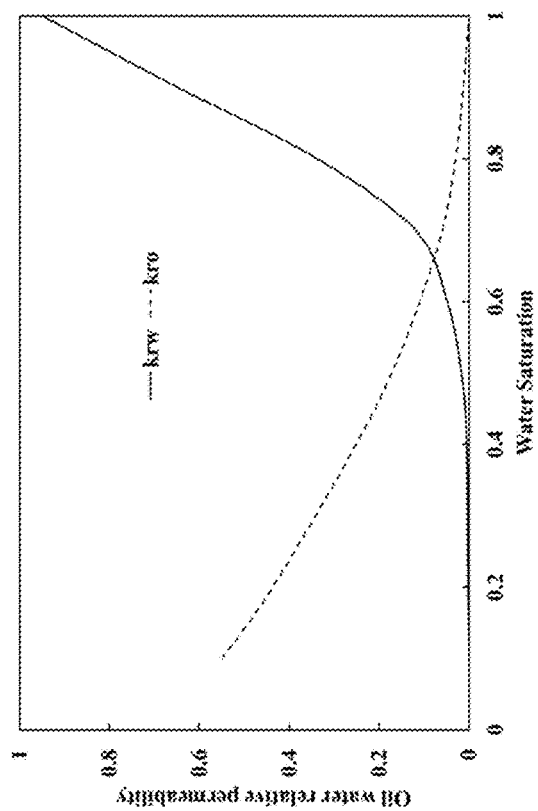
FIG. 4A displays a graphical presentation of an oil-water relative permeability model, in accordance with embodiments.

The water oil and gas liquid relative permeabilities are characterized by the generalized Corey correlations. The parameters used in the reservoir simulation are shown in FIGS. 4A and 4B and Table 4.

TABLE 4

Parameters in the generalized Corey correlations in relative permeability
Generalized Corey Correlations

| | |
|---|---|
| $S_{orw}$ | 0 |
| $S_{gc}$ | 0 |
| $S_{iw}$ | 0.107 |
| $n_{ow}$ | 2 |
| $n_g$ | 2 |
| $n_w$ | 5 |
| $k_{rocw}$ | 0.55 |
| $k_{rgcw}$ | 1 |
| $k_{rwro}$ | 1 |
| $k_{rwgc}$ | 0.55 |

It is noted that Arun is a unique reservoir including condensate reserves, geothermal resources, and $CO_2$ storage potential. The performance of the reservoir is history-matched in injection rate, production rate, and reservoir pressure. The parameters used for the history match are given in Table 5.

TABLE 5

History match parameters

| Variables | Base | Range |
|---|---|---|
| Rock compressibility (1/psi) | $6.90 \times 10^{-6}$ | ±25% |
| Horizontal Permeability (Layer 1) (md) | 51.5 | ±25% |
| Horizontal Permeability (Layer 2) (md) | 131 | ±25% |
| Horizontal Permeability (Layer 3) (md) | 15 | ±25% |
| Horizontal Permeability (Layer 4) (md) | 6.7 | ±25% |
| Horizontal Permeability (Layer 5) (md) | 1.2 | ±25% |
| Vertical Permeability (Layer 1) (md) | 5.15 | ±25% |
| Vertical Permeability (Layer 2) (md) | 13.1 | ±25% |
| Vertical Permeability (Layer 3) (md) | 1.5 | ±25% |
| Vertical Permeability (Layer 4) (md) | 0.67 | ±25% |
| Vertical Permeability (Layer 5) (md) | 0.12 | ±25% |
| Water oil relative permeability end point | 0.55 | ±25% |
| Gas liquid relative permeability end point | 0.55 | ±25% |

| Matched field data | Start year | End year |
|---|---|---|
| Gas injection rate | 1977 | 1997 |
| Gas production rate | 1977 | 2015 |
| Oil production rate | 1977 | 2015 |
| Water production rate | 1977 | 2015 |
| Reservoir pressure | 1977 | 2010 |

The history match is performed using the CMG simulator. Matched results are assessed by the following error functions including the root mean squared error (RMSE) and coefficient of determination ($R^2$). The smallest RMSE and largest $R^2$ provide the closest matched simulation result compared with the actual field result.

$$RMSE = \sqrt{\frac{1}{n}\sum_{i=1}^{n}\left(Y_i^{simulation} - Y_i^{actual}\right)^2}$$

$$R^2 = 1 - \frac{\sum_{i=1}^{n}\left(Y_i^{simulation} - Y_i^{actual}\right)^2}{\sum_{i=1}^{n}\left(Y_i^{simulation} - \overline{Y_i^{actual}}\right)^2}$$

$$\overline{Y_i^{actual}} = \frac{1}{n}\sum_{i=1}^{n}Y_i^{actual}$$

Once a satisfactory history match model is obtained, simulations are conducted to forecast results of $CO_2$-EGR, heat mining, and $CO_2$ storage. Three simulation cases, defined in Table 6, are run. Development of the Arun reservoir started with produced gas re-injection to maintain reservoir pressure between 1977 and 1997. The reservoir was in the depletion stage between 1997 to 2015 and was then shut-in between 2015 to 2021. Successful history matching of reservoir pressure, gas injection and production, and water and oil production by reservoir simulation was obtained. The $CO_2$ EGR is simulated between 2021 to 2037 for Cases 1-3. For Case 1, the $CO_2$ heat mining is simulated after the $CO_2$ EGR between 2037-2087, followed by $CO_2$ storage between 2087 to 2107. For Case 2, the $CO_2$ storage is simulated between 2037 to 2057. There is no subsequent heat mining. Case 3 is the same as Case 2 between 1977 to 2057. $CO_2$ heat mining is simulated between 2057 to 2107 after the $CO_2$ storage.

TABLE 6

Details of case studies

| Year | Case 1 | Case 2 | Case 3 |
|---|---|---|---|
| 1977-1997 | Produced gas re-injection | Produced gas re-injection | Produced gas re-injection |
| 1997-2015 | Reservoir depletion | Reservoir depletion | Reservoir depletion |
| 2015-2021 | Shut-in | Shut-in | Shut-in |
| 2021-2037 | $CO_2$ EGR | $CO_2$ EGR | $CO_2$ EGR |
| 2037-2057 | $CO_2$ heat mining | $CO_2$ storage | $CO_2$ storage |
| 2057-2087 | $CO_2$ heat mining | | $CO_2$ heat mining |
| 2087-2107 | $CO_2$ storage | | $CO_2$ heat mining |

The Arun reservoir was developed in four clusters with a total of 118 wells. Production came from 65 producers. Another 12 wells were injectors. Other wells failed by subsidence and formation failure. In the reservoir simulations, only 65 producers and 12 injectors are included. In each case, the well constraints in our simulation study are given in Table 7. Between 1977 to 1997, produced gas, after condensate separation, is reinjected into the reservoir for pressure maintenance. The injection rate is limited to 836 MMscf/d for 12 injectors and the production rate is limited to 3,500 MMscf/d for 65 producers due to limited compressors capacity. Although the compressors have additional capacity, compressors in Cluster II (FIG. 1) are not fully loaded. Between 1997 to 2015, the reservoir is in depletion. Twelve injectors are shut-in and 65 producers are constrained at a production rate of 3,500 MMscf/d and a producer bottom hole pressure of 200 psi (1.38 MPa). Between 2015 to 2021, the reservoir is shut-in. Afterwards during $CO_2$ EGR, $CO_2$ is injected into 12 injectors at the rate of 1,400 tons/d (117 ton/d per well) and 65 producers are constrained at a maximum production rate of 3,500 MMscf/d. During $CO_2$ heat mining in Case 1 and Case 3, another 18 producers are converted into the injectors giving a total of 30 injectors. The total $CO_2$ injection rate is 178,000 ton/d. The 47 producers are constrained at a maximum production rate limit of 3,500 MMscf/d. During $CO_2$ storage in all cases, all producers are converted into $CO_2$ injectors giving a total of 77 injectors with a total $CO_2$ injection rate of 386,000 ton/d. $CO_2$ storage is limited by the fracture pressure of the cap rock. To ensure safe operation, an injector bottomhole pressure limit is set at the initial reservoir pressure of 7,115 psi (49.06 MPa).

TABLE 7

Well constraints in simulation study

| Development of the Arun reservoir | Well constraints |
|---|---|
| Produced gas re-injection | |
| Injectors | 12 |
| Producers | 65 |
| Injection pressure (MPa) | 49.06 |
| Total gas injection rate (MMscf/d) | 836 |
| Producer pressure (MPa) | 1.38 |
| Total gas production rate (MMscf/d) | 3,500 |
| End of produced gas re-injection Reservoir depletion | |
| Injectors | 0 |
| Producers | 65 |
| Producer pressure in megapascals (MPa) | 1.38 |

TABLE 7-continued

Well constraints in simulation study

| Development of the Arun reservoir | Well constraints |
|---|---|
| Total gas production rate (MMscf/d) | 3,500 |
| End of reservoir depletion Shut-in | |
| End of shut-in $CO_2$ EGR | |
| Injectors | 12 |
| Producers | 65 |
| Injection pressure (MPa) | 49.06 |
| Total $CO_2$ injection rate (ton/d) | 1,400 |

TABLE 7-continued

Well constraints in simulation study

| Development of the Arun reservoir | Well constraints |
|---|---|
| Producer pressure (MPa) | 1.38 |
| Total gas production rate (MMscf/d) | 3,500 |
| End of $CO_2$ EGR | |
| $CO_2$ heat mining | |
| Injectors | 30 |
| Producers | 47 |
| Injection pressure (MPa) | 49.06 |
| Total $CO_2$ injection rate (ton/d) | 178,000 |
| Producer pressure (MPa) | 1.38 |
| Total gas production rate (MMscf/d) | 3,500 |
| End of $CO_2$ heat mining | |
| $CO_2$ storage | |
| Injectors | 77 |
| Producers | 0 |
| Injection pressure (MPa) | 49.06 |
| Total $CO_2$ injection rate (ton/d) | 386,000 |
| End of $CO_2$ storage | |

The Net Present Value (NPV) is set as the objective function for the $CO_2$-EGR, heat mining, and $CO_2$ sequestration:

$$NPV = S_c \cdot Q_c \cdot (1-Q_r) + S_e \cdot Q_h \cdot E_h - C_p - Q_{CO_2} \cdot C_{CO_2} - N_{well} \cdot C_{well}(1+C_p)$$

where $S_c$ is the sale amount of condensate; $Q_c$ is the quantity of the condensate; $Q_r$ is the local authority royalty; $S_e$ is the sale amount of electricity; $Q_h$ is the quantity of the heat mining; $E_h$ is the efficiency of converting geothermal energy to electricity; $C_p$ is the cost of geothermal power plant; $Q_{CO_2}$ is the quantity of $CO_2$ sequestered; $C_{CO_2}$ is the unit cost of the $CO_2$ which includes carbon tax; $N_{well}$ is the number of wells in the field; $C_{well}$ is the operation cost per well; $C_v$ is the variable cost for each well due to well service and failure.

Results

Figure 5:
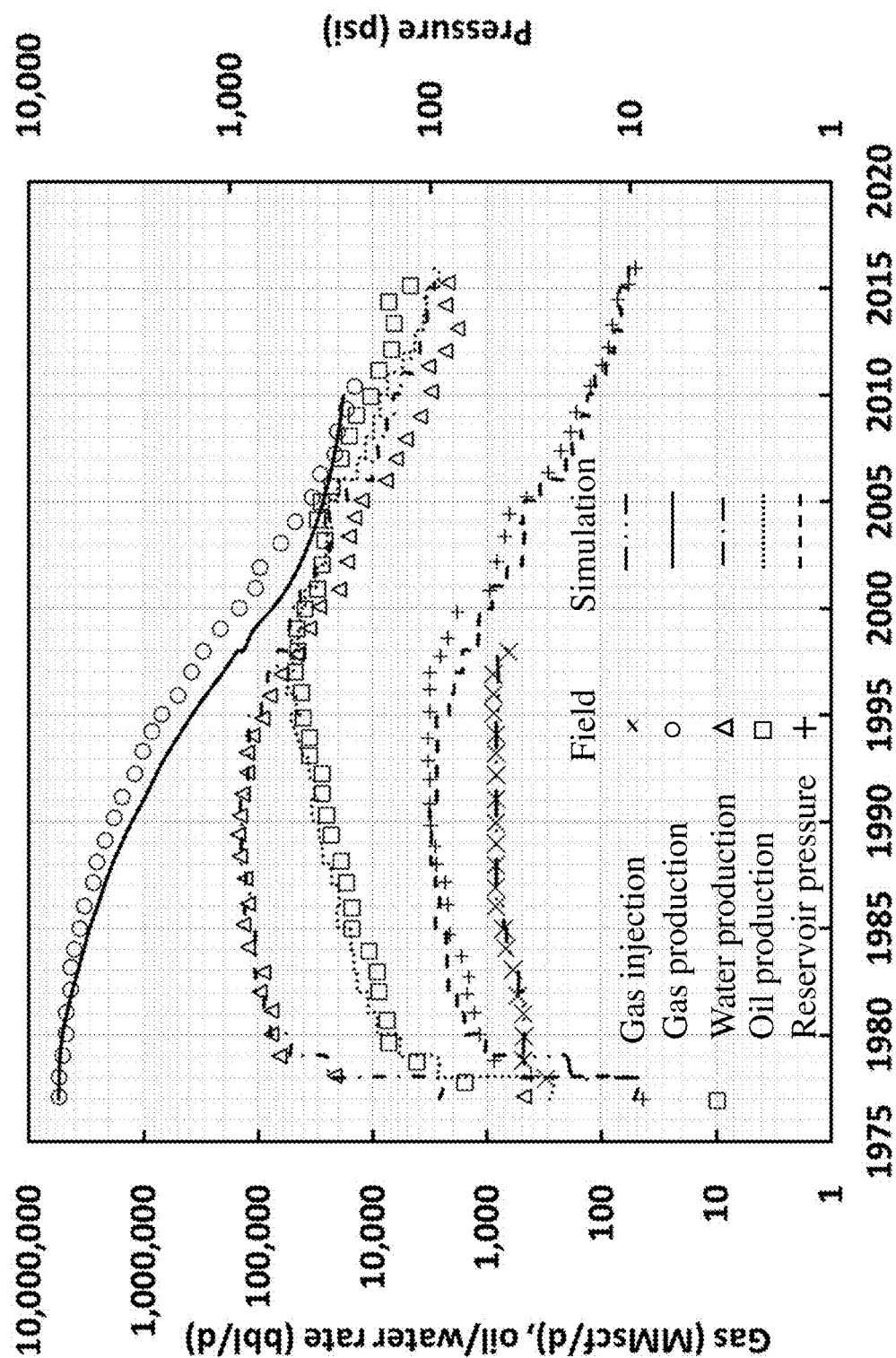
FIG. 5 displays a graphical presentation of a comparison of reservoir performance over time between field production and simulation results, in accordance with embodiments.

History matching is performed to give a best fit between the simulation results and reservoir performance between 1977 and 2015. Gas injection in the simulation is represented by a line adjacent field data that is represented by "x" shapes in FIG. 5. Additionally, gas production in the simulation is represented by a line adjacent field data that is represented by circles, water production in the simulation is represented by a line adjacent field data that is represented by triangles, oil production in the simulation is represented by a line adjacent field data that is represented by squares, and reservoir pressure in the simulation is represented by a line adjacent field data that is represented by "+" shapes. Cumulative injected gas is 5.2 trillion standard cubic feet (Tscf) as of 1997. Afterwards, the gas injection is terminated and the production rate begins to decrease. A water production rate follows the same trend as the gas production rate. The trend in the simulated water rate indicates that the produced water comes mostly from the water condensed from the high temperature (351° F.) reservoir gas. During gas injection, condensate production is maintained at a peak rate of around 145 Mbbl/d. Pressure decline is also delayed because of the gas injection.

Figure 6:
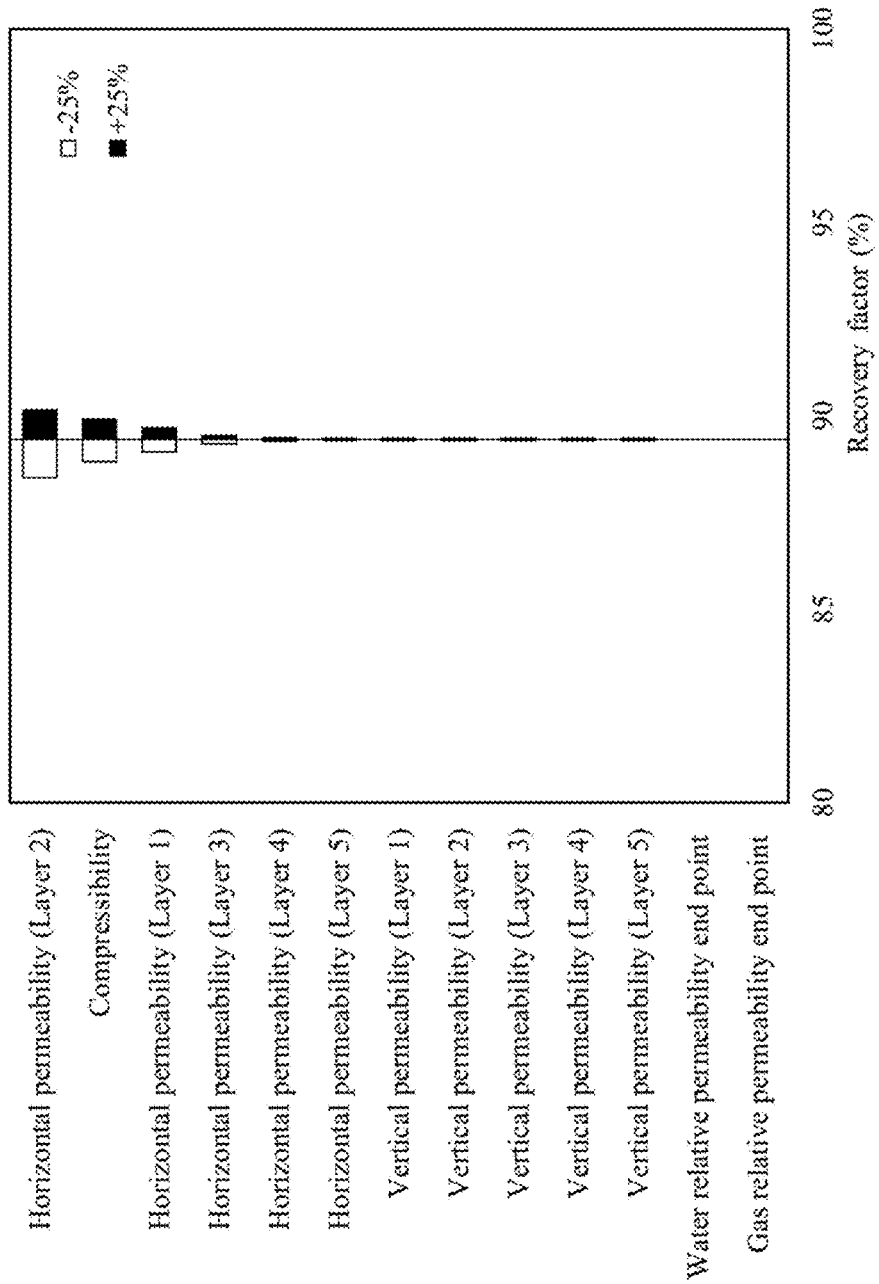
FIG. 6 displays a graphical presentation of the sensitivity of recovery factor to the parameters used in history matching, in accordance with embodiments.

The variables in the base case and optimal cases are summarized in Table 8. In this embodiment, five hundred simulation runs are tested. Overall, the history match provides an $R^2$ of 96.9%. The minimum error is reduced to 11.3%. The horizontal permeability in the second layer has the biggest impact on the reservoir performance, followed by the rock compressibility and the horizontal permeability in the first layer (FIG. 6).

TABLE 8

Variables in the base and optimal cases

| Variables | Base | Optimal |
|---|---|---|
| Rock compressibility (1/psi) | $6.90 \times 10^{-6}$ | $8.62 \times 10^{-6}$ |
| Horizontal Permeability (Layer 1) (md) | 51.5 | 43.88 |
| Horizontal Permeability (Layer 2) (md) | 131 | 163.75 |
| Horizontal Permeability (Layer 3) (md) | 15 | 14.1 |
| Horizontal Permeability (Layer 4) (md) | 6.7 | 5.89 |
| Horizontal Permeability (Layer 5) (md) | 1.2 | 0.95 |
| Vertical Permeability (Layer 1) (md) | 5.15 | 4.57 |
| Vertical Permeability (Layer 2) (md) | 13.1 | 11.31 |
| Vertical Permeability (Layer 3) (md) | 1.5 | 1.69 |
| Vertical Permeability (Layer 4) (md) | 0.67 | 0.79 |
| Vertical Permeability (Layer 5) (md) | 0.12 | 0.1 |
| Water oil relative permeability end point | 0.55 | 0.53 |
| Gas liquid relative permeability end point | 0.55 | 0.52 |

Figure 7:
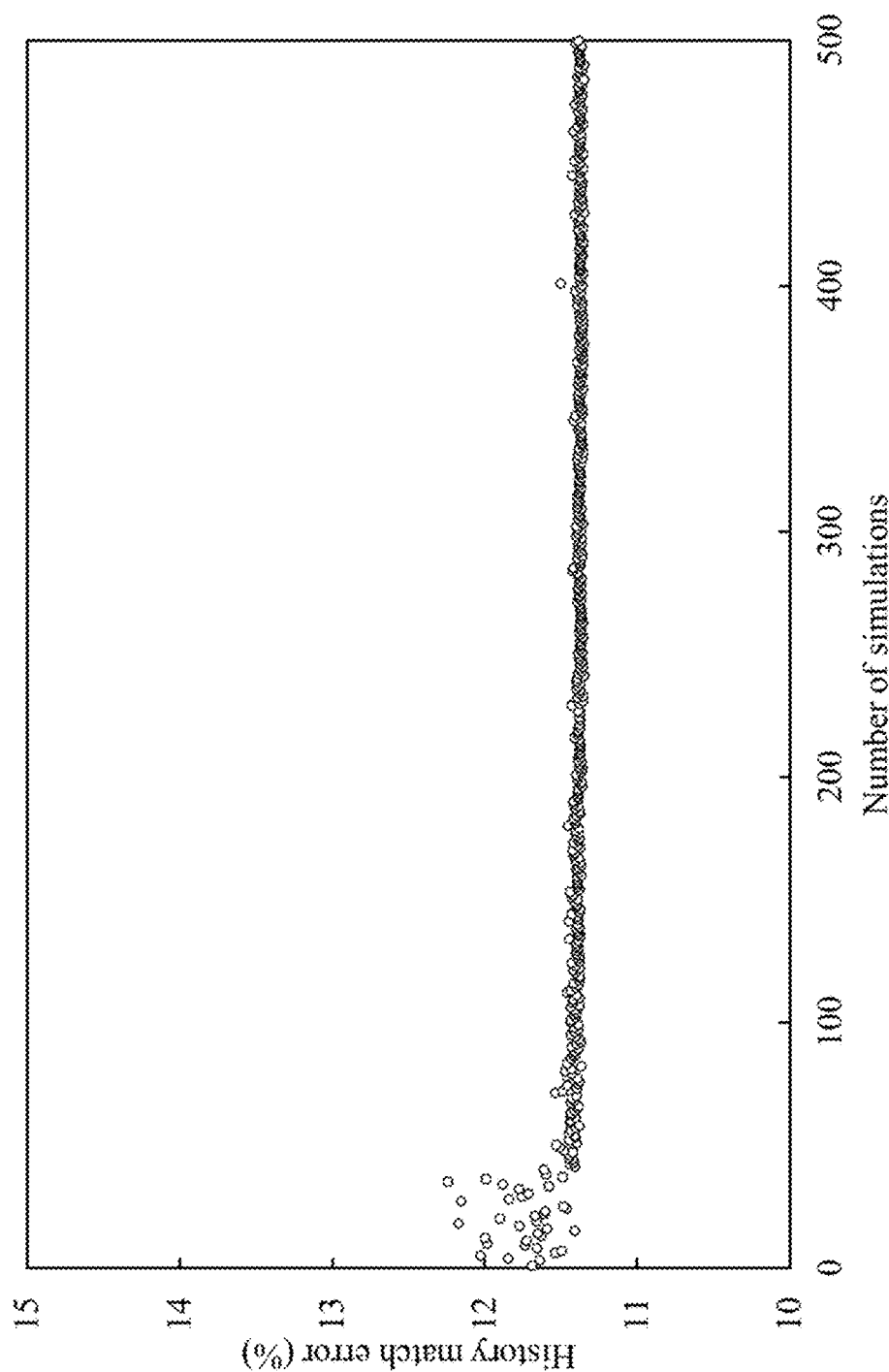
FIG. 7 displays a graphical presentation of percent error between simulation data and field results, in accordance with embodiments.
Figure 8B:
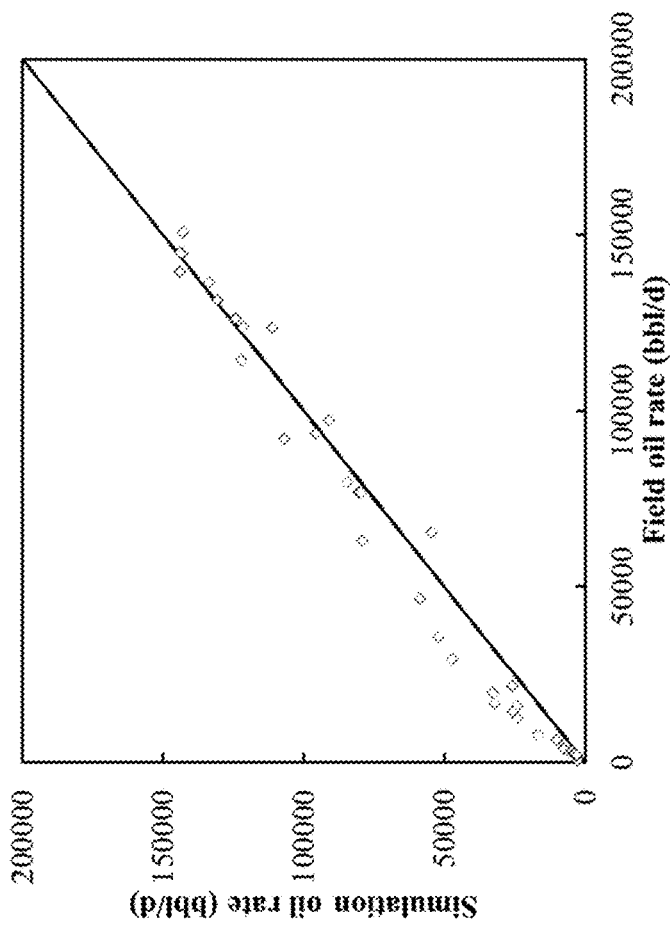
FIG. 8B displays a graphical presentation of simulation oil rates in barrels of oil per day (bbl/d) of a reservoir model in relation to field oil rates (bbl/d) of a reservoir, in accordance with embodiments.
Figure 8A:
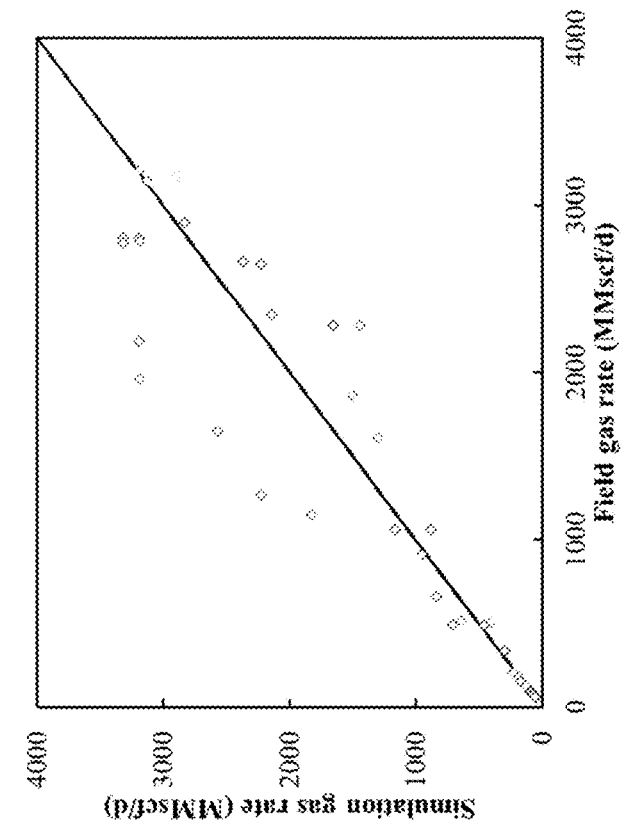
FIG. 8A displays a graphical presentation of simulation gas rates (MMscf/d) of a reservoir model in relation to field gas rates (MMscf/d) of a reservoir, in accordance with embodiments.
Figure 8D:
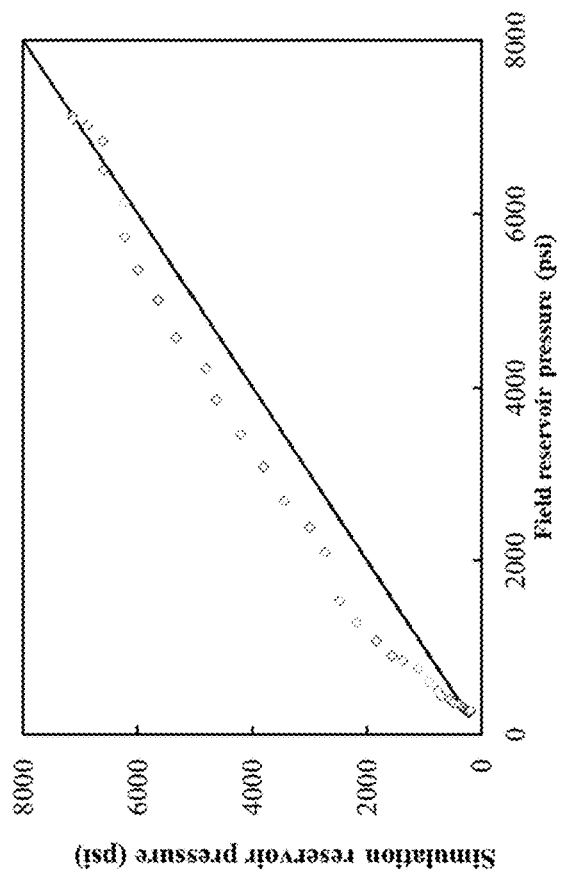
FIG. 8D displays a graphical presentation of simulation reservoir pressure (psi) of a reservoir model in relation to field reservoir pressure (psi) of a reservoir, in accordance with embodiments.
Figure 8C:
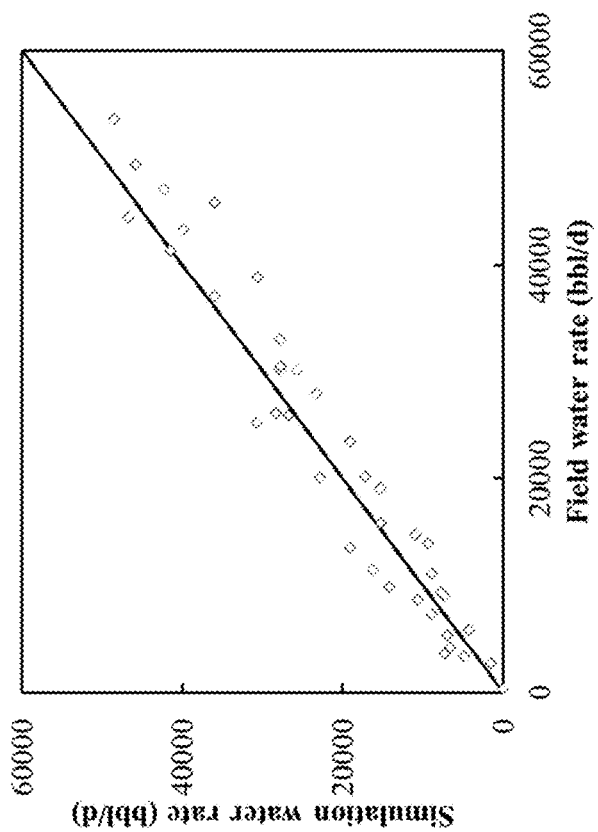
FIG. 8C displays a graphical presentation of simulation water production rates (bbl/d) of a reservoir model in relation to field water production rates (bbl/d) of a reservoir, in accordance with embodiments.
Figure 8E:
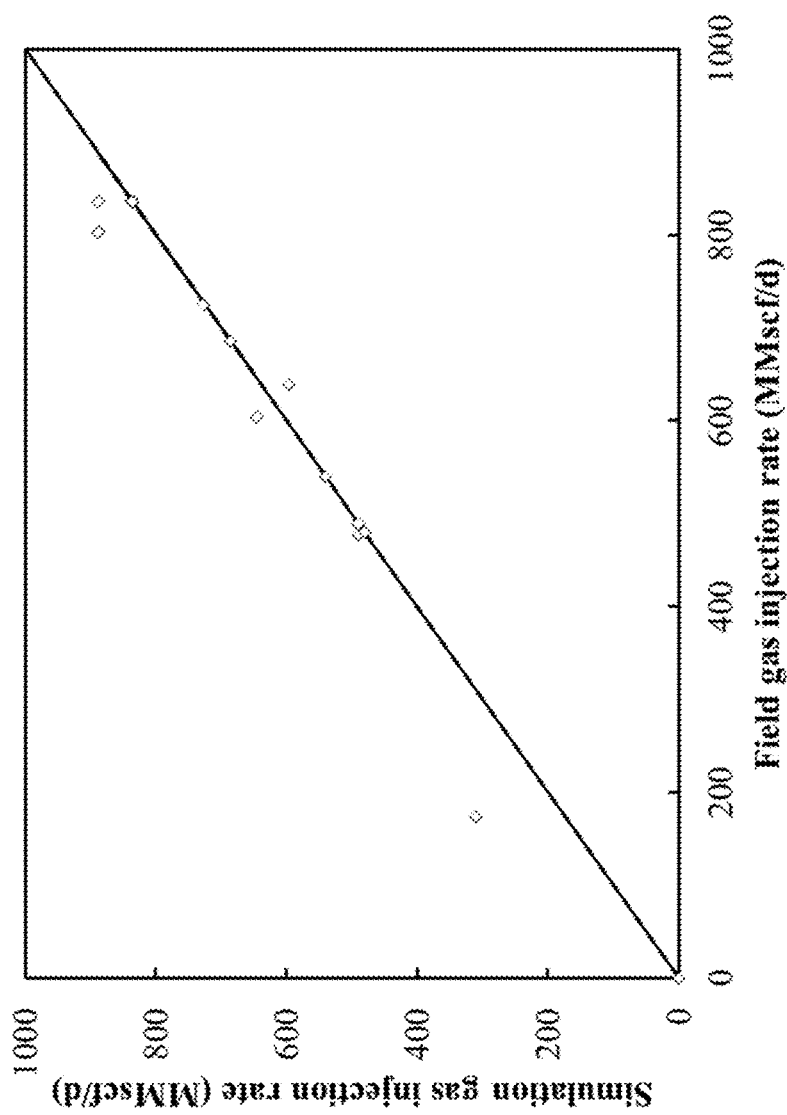
FIG. 8E displays a graphical presentation of simulation gas injection rates (MMscf/d) of a reservoir model in relation to field gas injection rates (MMscf/d) of a reservoir, in accordance with embodiments.

In an embodiment, a utilized model has an error of 11.3% between the simulation results and the field data as shown in FIG. 7 (gas injection rate, gas production rate, oil production rate, water production rate, and reservoir pressure). It is noted that the errors potentially occur for one or more of the following reasons. First, numerical uncertainties from the coarse model in the study may cause errors. The impact of a coarse model on the results varies case by case. Second, reservoir heterogeneity may cause errors to some extent. Third, operation activities of the wells and facilities during field development vary from time to time. It is not easy to update all of the operational issues for the reservoir model. In order to determine the source of errors in the simulation history match, scatter plots with a 45° line are reviewed (FIGS. 8A-8E). The plots are also used to check the deviation between field data and simulation results. Overall, the injection rate has the best match with $R^2$ of 99%, followed by the reservoir pressure, oil production rate, and water production rate with $R^2$ of 97%, 96% and 94%, respectively. The gas rate matched results have an $R^2$ of 88%.

In terms of numerical uncertainties from the coarse model, the errors in the grid blocks always exist at all time step for all curves. As time continues, numerical errors from the coarse model should increase for all curves. However, the five curves have different matching results. They have a better match when the data is located in the left end and right end of the 45° line, which represents the smallest or largest data sets, respectively (FIGS. 8A-8E). The plots in the middle part of the production data give the largest variation between field data and simulation results (FIGS. 8A-8E). The smallest data represent the start of the field development and the largest data indicate the production peak. The middle part of the production data set represents either the production increases up to the peak or the production declines. All these indicate errors from the coarse model are not a key issue for the simulation. The coarse model can represent the gas migration and fluid production with a fairly good match. A fine model may improve the history matching results but not significantly. The time required for a fine model will be much longer than that of the coarse model.

As for simulation errors from reservoir heterogeneity, it is noted that embodiments of the model are assumed to be spatially homogeneous in each layer. The heterogeneity is represented by different porosity and permeability in each layer. First, the Arun field was deposited in a marine depositional cycle without rapid subsidence. The permeability variation in each layer represents the average formation property in the sedimentary sequence. Second, there is no access to seismic and well logs data to apply different porosity-permeability values for all blocks in the simulation. In the simulation embodiment, gas can easily migrate into different grid blocks. The simulation should give larger errors for gas production, followed by the water and oil production. The errors can be bigger when the production rate is higher because of the heterogeneity. However, the history matching in the simulation is better at the largest gas, oil, and water production rate than the smaller production rates (FIGS. 8A-8E). Oil production matched results are also better than the water production matches. All these indicate errors from the reservoir heterogeneity is not a key issue for the simulation in this study.

Figure 9:
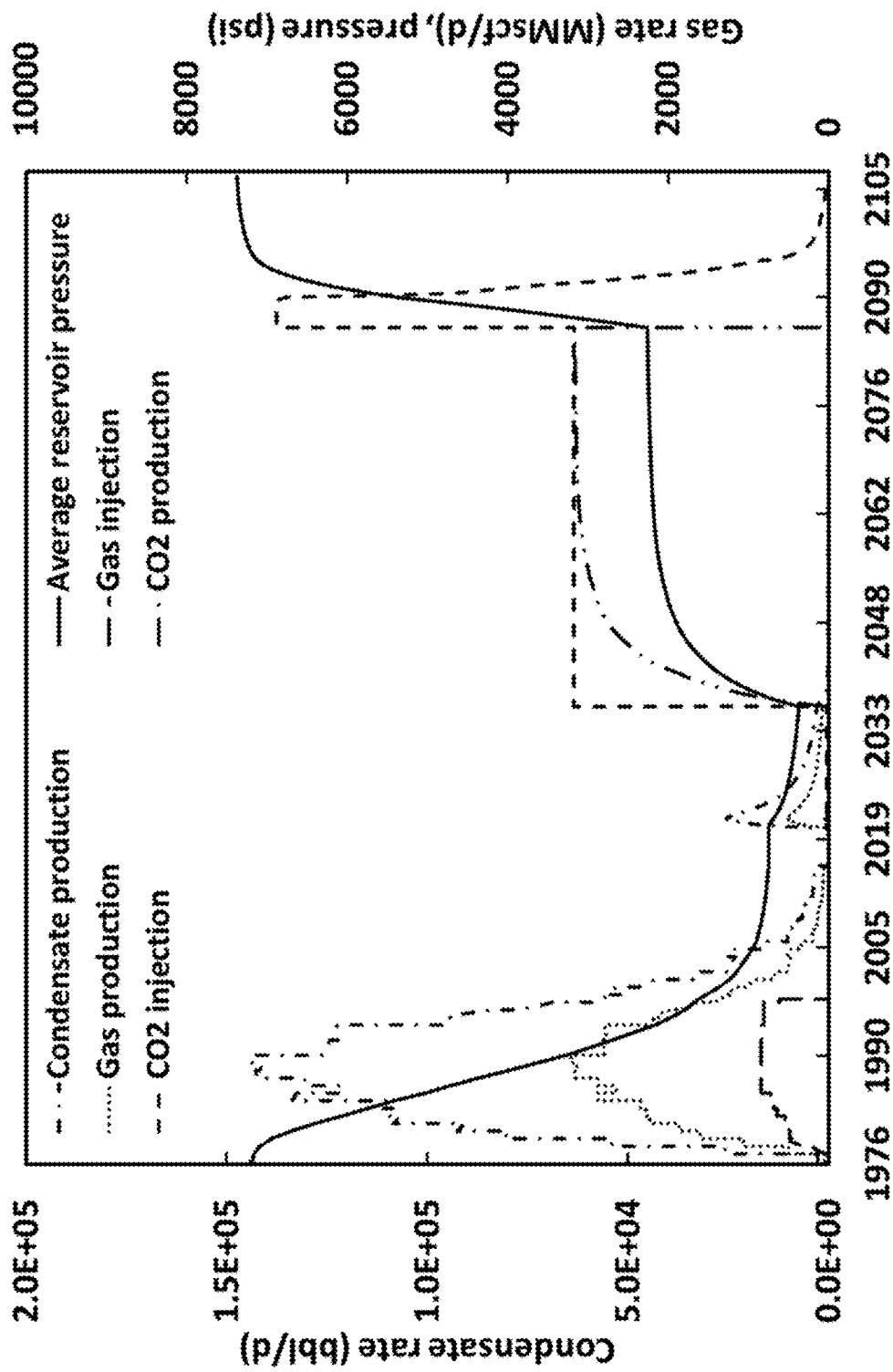
FIG. 9 displays a graphical presentation of results of a first simulation of the injection rates and production rates and reservoir pressure in accordance with embodiments.

As for simulation errors from operational activities, it can occur at any time steps for any of the injection, production, and reservoir pressure history matching. It is observed that the simulation results are sometimes bigger and sometimes smaller than the field data (FIGS. 8A-8E). The exact time for wells and facilities failures requiring well services was not recorded. The impact of these operation activities on the injection, production, and reservoir pressure were not recorded. As disclosed, the operational issues are not included in the simulation. The history match is deemed satisfactory given the complexity of the Arun reservoir. The history-matched reservoir model is used to forecast the reservoir response to $CO_2$ EGR, heat mining, and $CO_2$ storage. Results are shown in FIGS. 9A-9C.

In Case 1, the reservoir is depleted by 65 producers without produced gas reinjection between 1997 to 2015. When the WTI dropped from $105/bbl to $37/bbl in 2015, the reservoir production was suspended. About 13% of ICIP or 109 MMbbl condensate remains in the field at shut-in. In the simulation, the reservoir restarts to produce with $CO_2$ injection between 2021 to 2107. Because $CO_2$ can easily breakthrough in a producer, a lower $CO_2$ injection rate (117 ton/d per injector) is applied between 2021 to 2037. $CO_2$ is injected at a total rate of 1,400 ton/d into 12 injectors between 2021 and 2037. The 65 producers are constrained with the bottom-hole pressure of 200 psi. The field condensate production, represented by the jagged line peaking around 1.5E+05 bbl/d, drops to 300 bbl/d in 2037. This is equivalent to the production rate in 2015 when the reservoir is shut-in. The $CO_2$ injection is increased during heat mining between 2037 and 2087. Eighteen of 65 producers are converted to the injectors giving a total of 30 injectors and 47 producers. The $CO_2$ injection is constrained to 178,000 ton/d into 30 injectors (5,933 ton/d per injector) and producers are constrained to the maximum production rate of 3,500 MMscf/d due to compressor capacity. There is a small amount of condensate produced in the heat mining. In the $CO_2$ storage phase beginning in 2087, all producers are converted into injectors and are constrained to a maximum bottomhole pressure of 7,115 psi which is the initial reservoir pressure. The $CO_2$ injection for storage continues between 2087 and 2107. At the end of the project, 52.7 MMbbl of condensate is produced. 1.2 Gt of $CO_2$ is stored when the reservoir pressure reaches the initial reservoir pressure in 2107 (Table 9).

Figure 10:
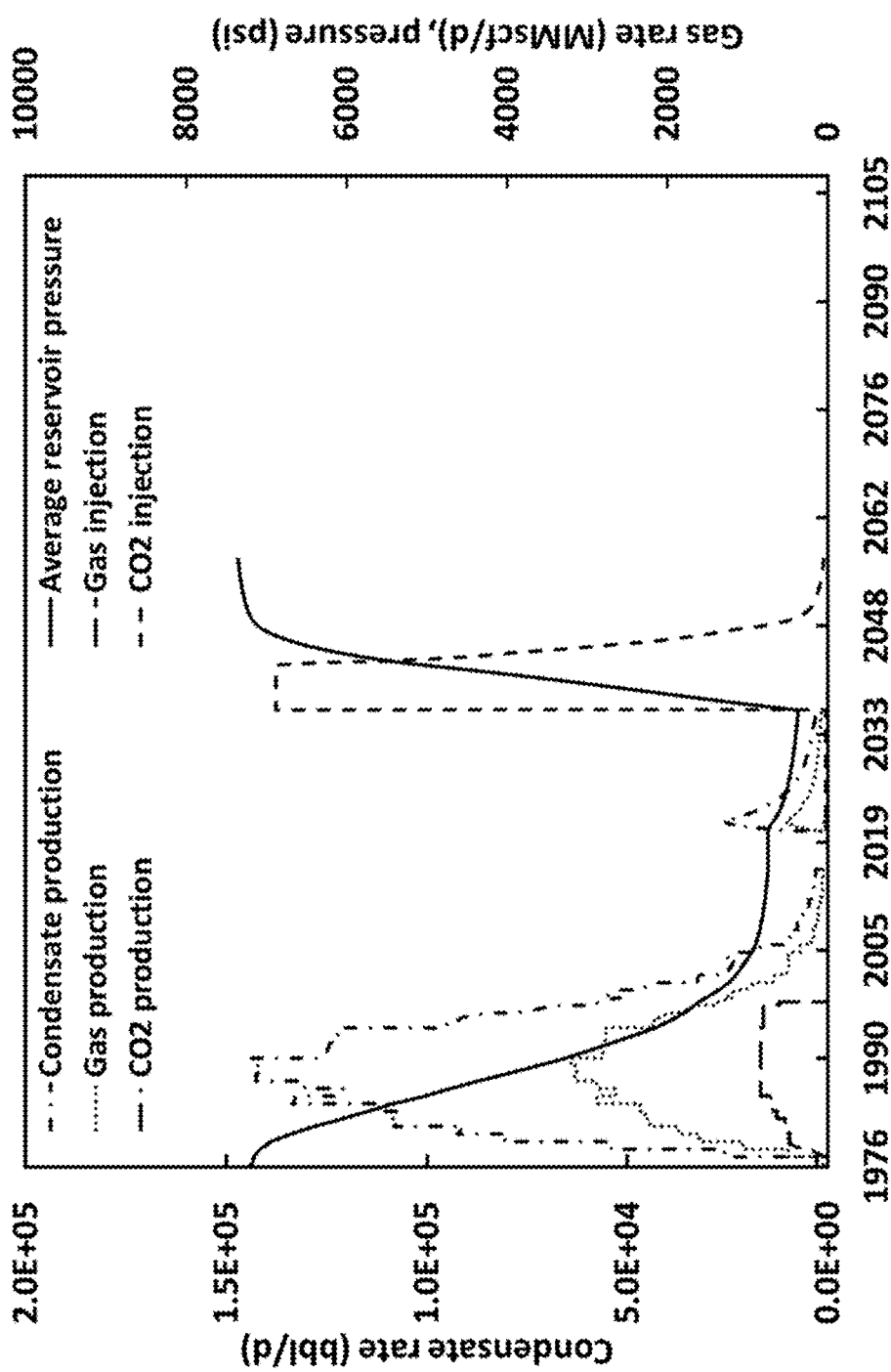
FIG. 10 displays a graphical presentation of results of a second simulation of the injection and production rates, and reservoir pressure, in accordance with embodiments.

In Case 2, the simulation is the same as Case 1 between 1977 to 2037. After $CO_2$-EOR, $CO_2$ storage is performed between 2037 and 2057 with no subsequent heat mining. All 65 producers are converted to injectors giving a total of 77 injectors. The injection rate is set at a rate of 386,000 ton/d into 77 injectors (5,013 ton/d per injector) and bottomhole pressure is constrained at 7,115 psi. As shown in FIG. 10, 51.3 MMbbl of condensate is produced. 1.2 Gt of $CO_2$ is stored when the reservoir pressure builds up to the initial reservoir pressure in 2057.

Figure 11:
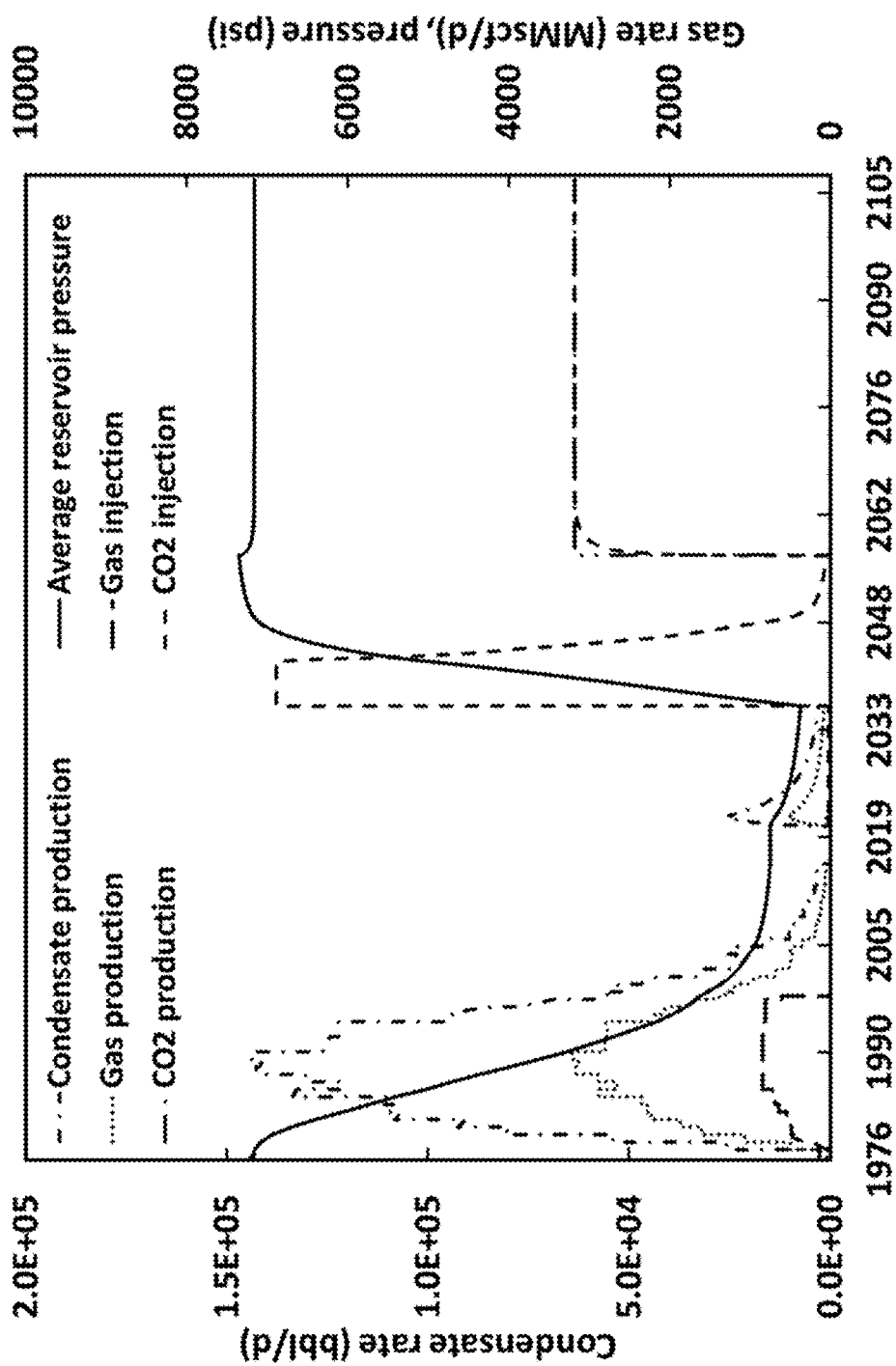
FIG. 11 displays a graphical presentation of results of a third simulation of the injection and production rates, and reservoir pressure, in accordance with embodiments.

In Case 3 (FIG. 11), the simulation is the same as in Case 1 between 1977 and 2037. Following $CO_2$-EOR, $CO_2$ storage is simulated between 2037 and 2057. This step is the same as that found in Case 2. Afterwards, the heat mining is simulated between 2057 and 2107. The $CO_2$ injection is limited to 178,000 ton/d into 30 injectors. The 47 producers are constrained by the maximum production rate of 3,500 MMscf/d. Results, shown in Table 9, show that Case 3 can store the same amount (1.2 Gt) of $CO_2$ as the other cases. Compared to Case 1, it recovers slightly less condensate, but produces slightly more geothermal electricity. In Case 3, $CO_2$ storage prior to the $CO_2$ heat mining helps to build up the reservoir pressure and a larger $CO_2$ heat mining rate can be achieved than $CO_2$ heat mining without prior $CO_2$ storage (Case 1).

Figure 12A:
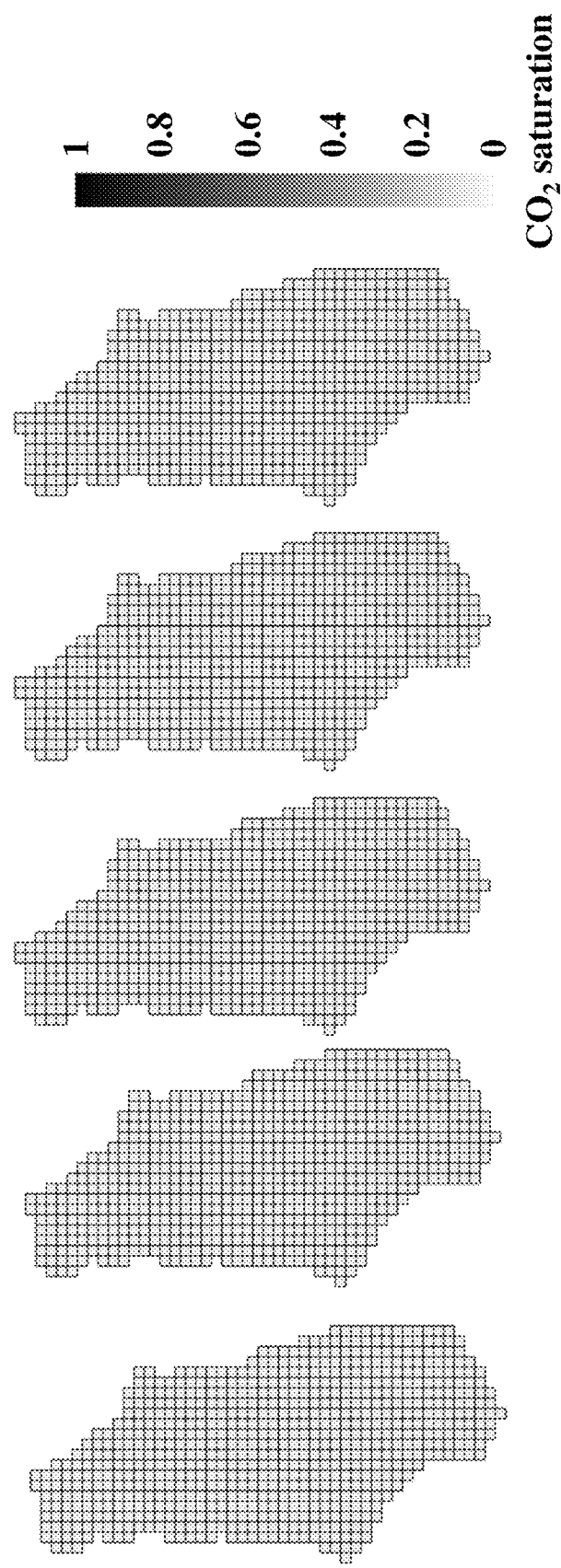
FIG. 12A displays a top view of top to bottom zones/layers of a reservoir model of a first simulation showing $CO_2$ saturation six years after (2021) the suspension of the field, in accordance with embodiments.
Figure 12B:
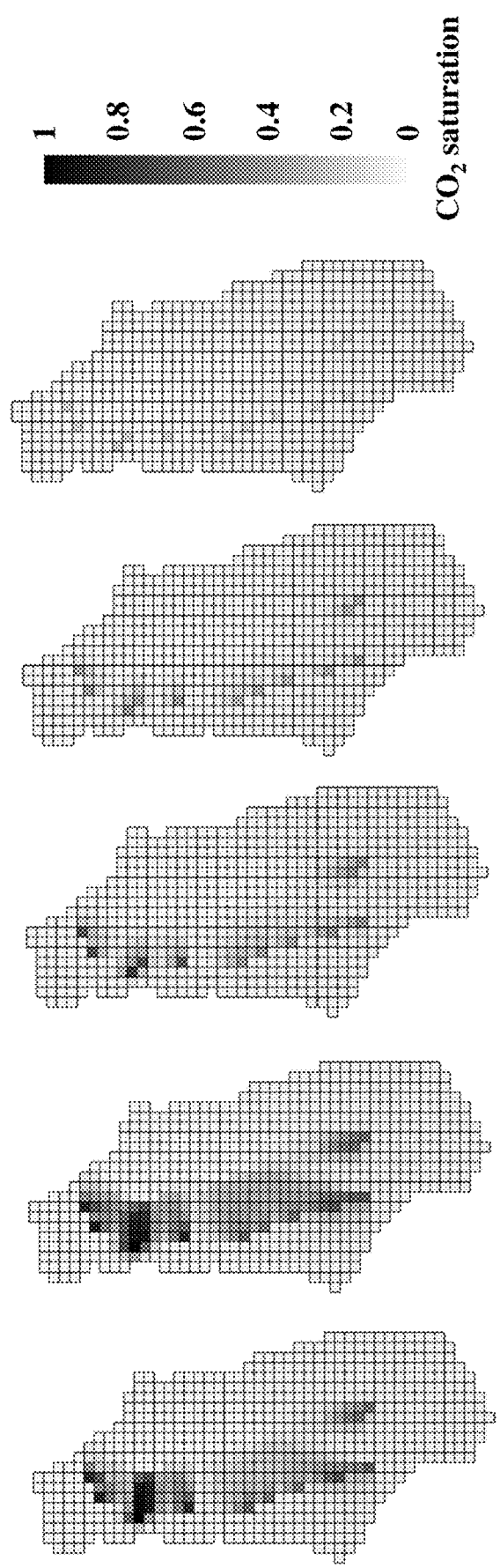
FIG. 12B displays a top view of top to bottom zones/layers of a reservoir model of a first simulation showing $CO_2$ saturation after 16 years of $CO_2$-EGR in 2037, in accordance with embodiments.
Figure 12C:
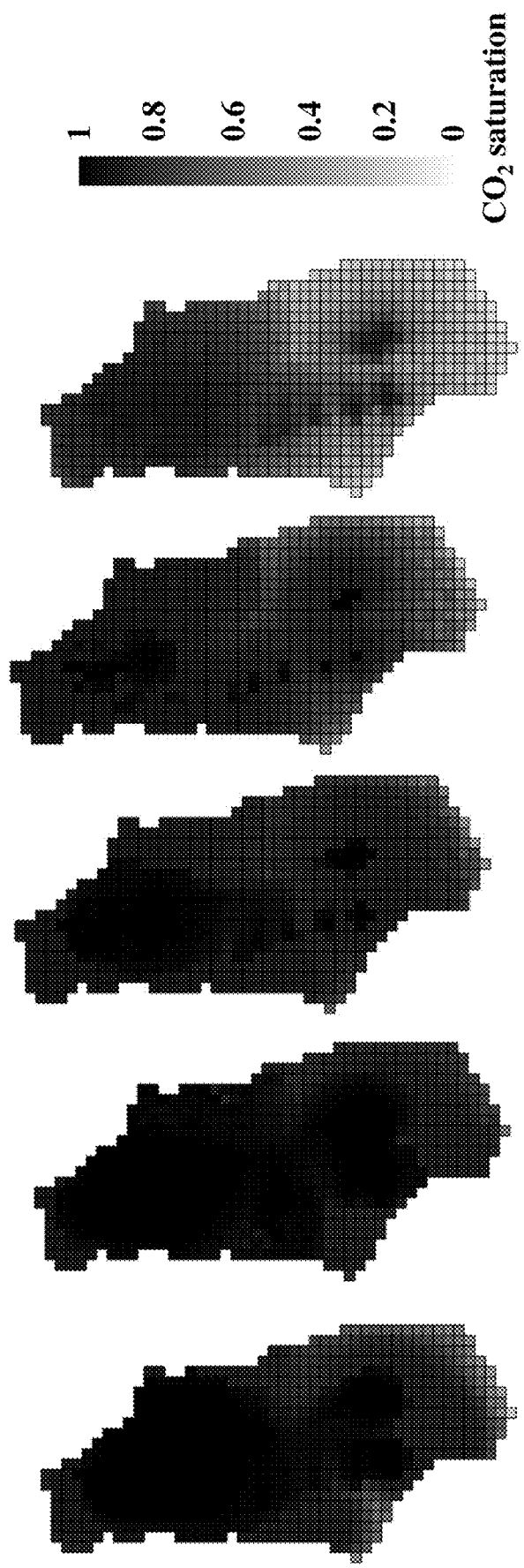
FIG. 12C displays a top view of top to bottom zones/layers of a reservoir model of a first simulation showing $CO_2$ saturation after 50 years of $CO_2$ heat mining in 2087, in accordance with embodiments.
Figure 12D:
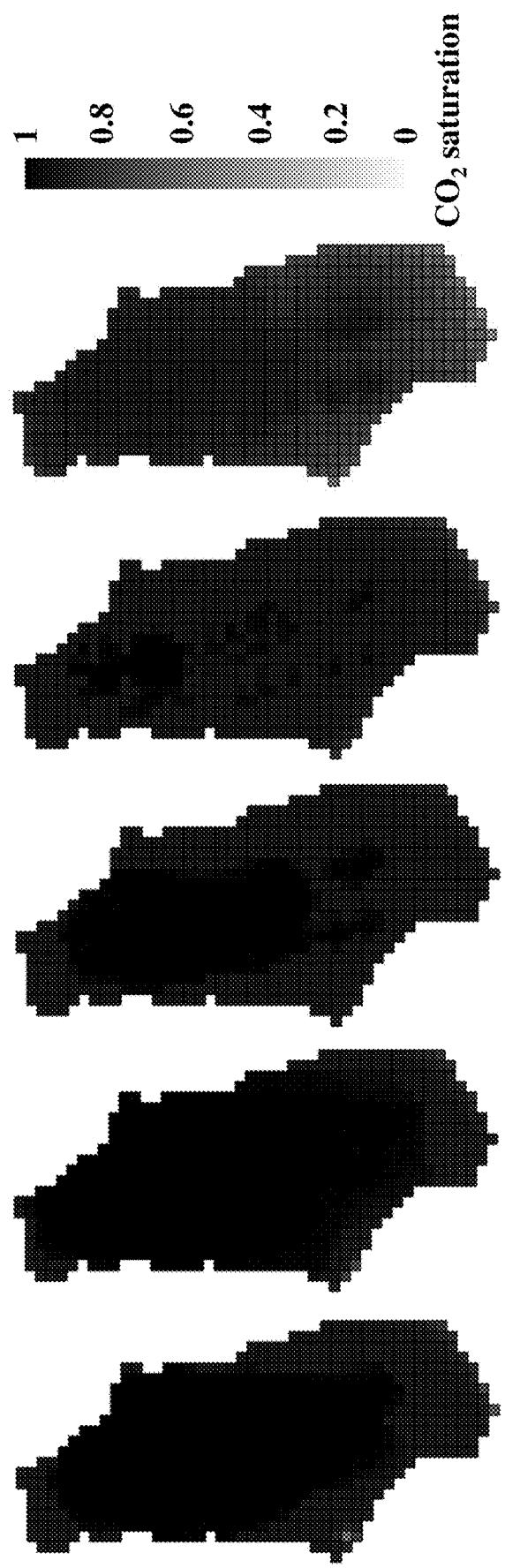
FIG. 12D displays a top view of top to bottom zones/layers of a reservoir model of a second simulation showing $CO_2$ saturation after 20 years of $CO_2$ storage in 2107, in accordance with embodiments.

The $CO_2$ saturation in Case 1 at different stages is given in FIGS. 12A-12D, where low $CO_2$ saturation is represented by shading on the bottom end of the scales and high $CO_2$ saturation is represented by shading on the top end of the scales. FIG. 12A shows zero $CO_2$ saturation in 2021, 6 years after the field is suspended in 2015. $CO_2$ saturation in 2037, after 16 years of $CO_2$ injection, is shown in FIG. 12B. Most of the injected $CO_2$ resides in the top two layers of the reservoir because $CO_2$ is less dense than the reservoir fluids. The second layer has the largest $CO_2$ saturation because of the higher permeability. $CO_2$ is recycled for heat mining between 2037 and 2087. $CO_2$ saturation in 2087 is given in FIG. 12C. Between 2087 and 2107, $CO_2$ is injected for storage. The $CO_2$ saturation at the end of $CO_2$ storage in 2107 is shown in FIG. 12D. By comparing FIGS. 12C and 12D, it can be seen that the $CO_2$ saturation increases significantly between 2087 and 2107 during the $CO_2$ storage phase.

Figure 13A:
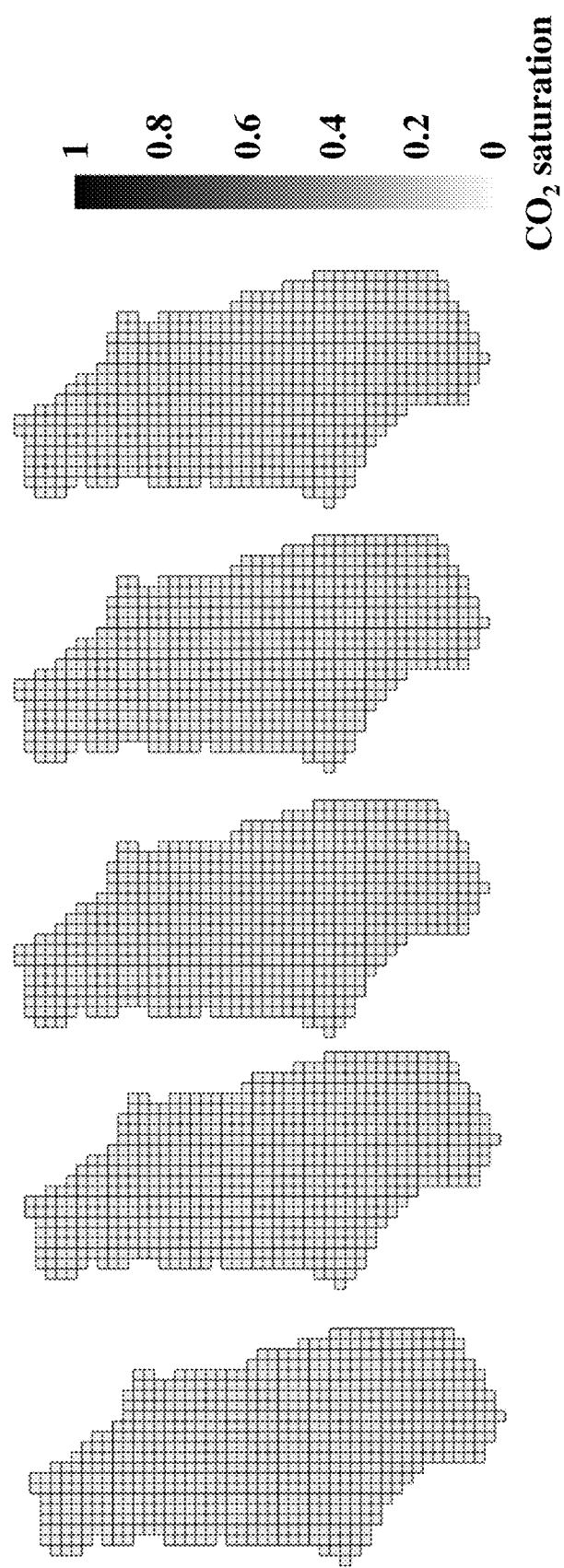
FIG. 13A displays a top view of top to bottom zones/layers of a reservoir model of a second simulation showing $CO_2$ saturation six years after (2021) the suspension of the field, in accordance with embodiments.
Figure 13B:
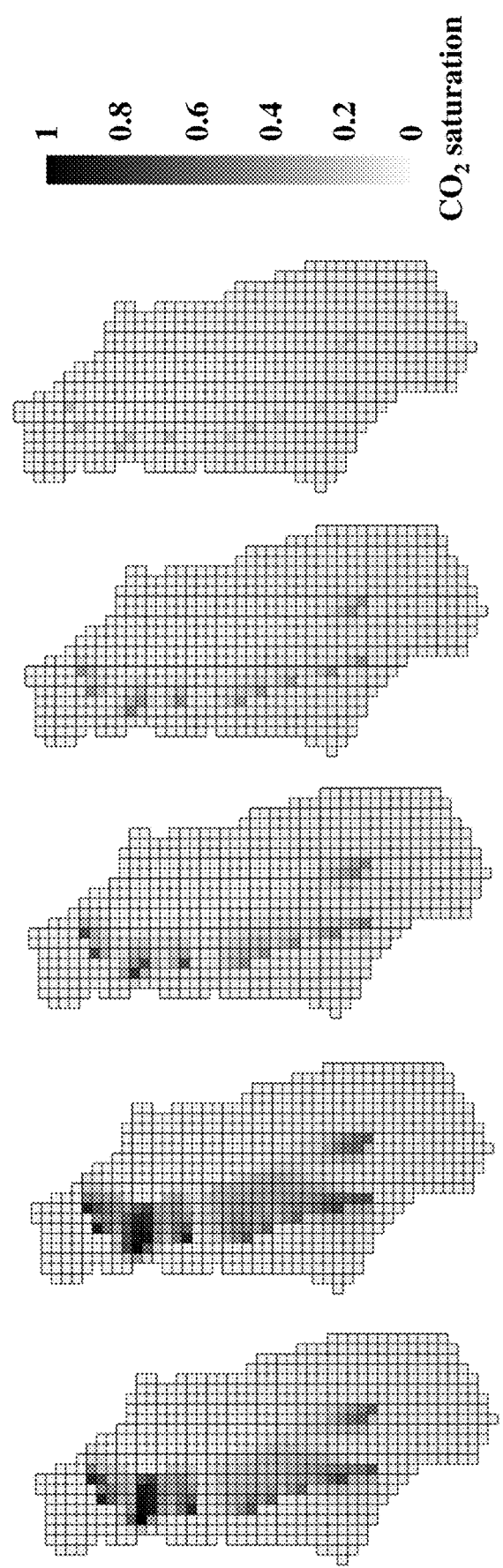
FIG. 13B displays a top view of top to bottom zones/layers of a reservoir model of a second simulation showing $CO_2$ saturation after 16 years of $CO_2$-EGR in 2037, in accordance with embodiments.
Figure 13C:
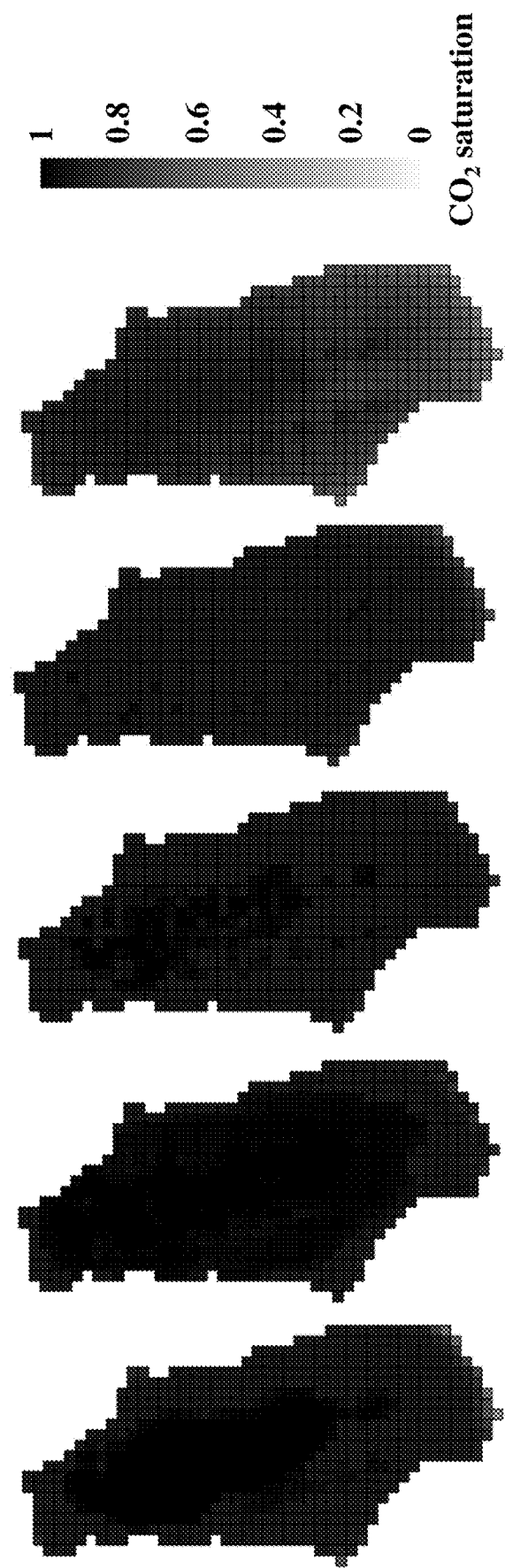
FIG. 13C displays a top view of top to bottom zones/layers of a reservoir model of a second simulation showing $CO_2$ saturation after 20 years of $CO_2$ storage in 2057, in accordance with embodiments.

The $CO_2$ saturation in Case 2 at different stages is given in FIGS. 13A-C, where low $CO_2$ saturation is represented by shading on the bottom end of the scales and high $CO_2$ saturation is represented by shading on the top end of the scales. The difference between Case 2 and Case 1 starts in 2037. The $CO_2$ storage is run in Case 2 after the $CO_2$-EGR. $CO_2$ saturation in FIG. 13A and FIG. 13B is same as that in FIG. 12A and FIG. 12B. Substantial amounts of $CO_2$ (1.2 Gt in Table 9) is stored in Case 2. The final $CO_2$ saturation at the end of $CO_2$ storage in FIG. 13C in Case 2 is similar to the $CO_2$ saturation in FIG. 12D in Case 1.

Figure 14A:
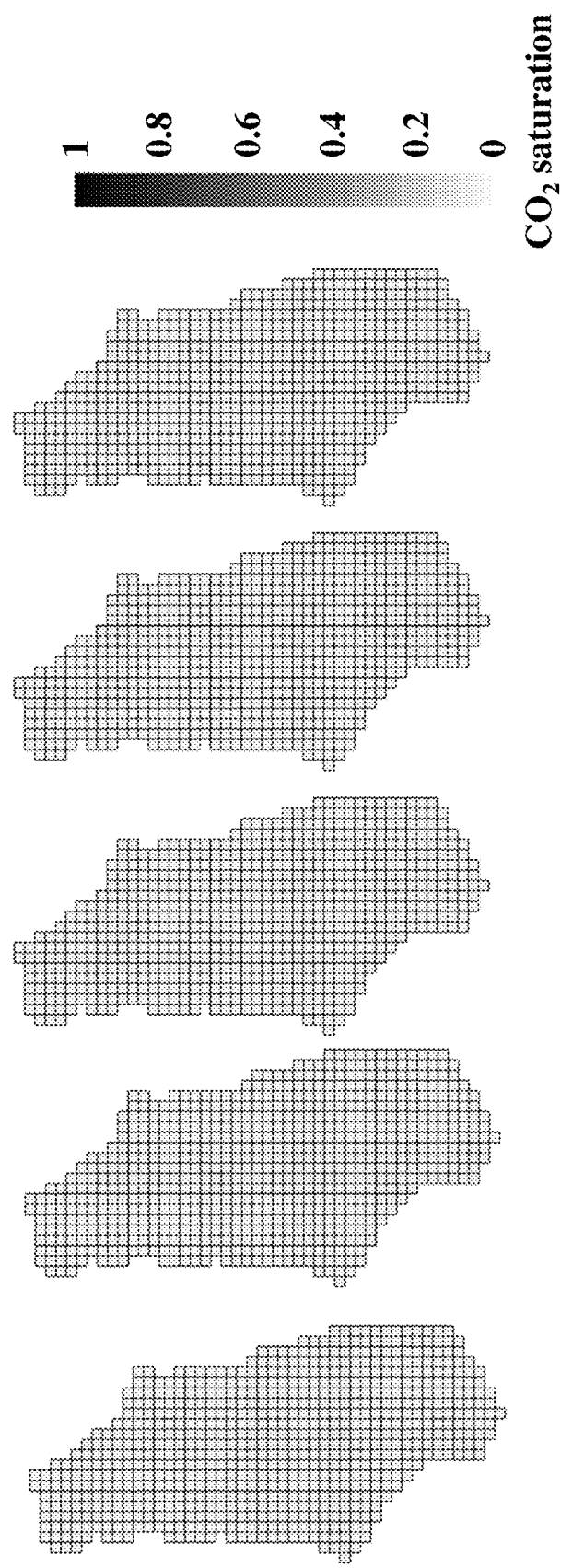
FIG. 14A displays a top view of top to bottom zones/layers of a reservoir model of a third simulation showing $CO_2$ saturation six years after (2021) the suspension of the field, in accordance with embodiments.
Figure 14B:
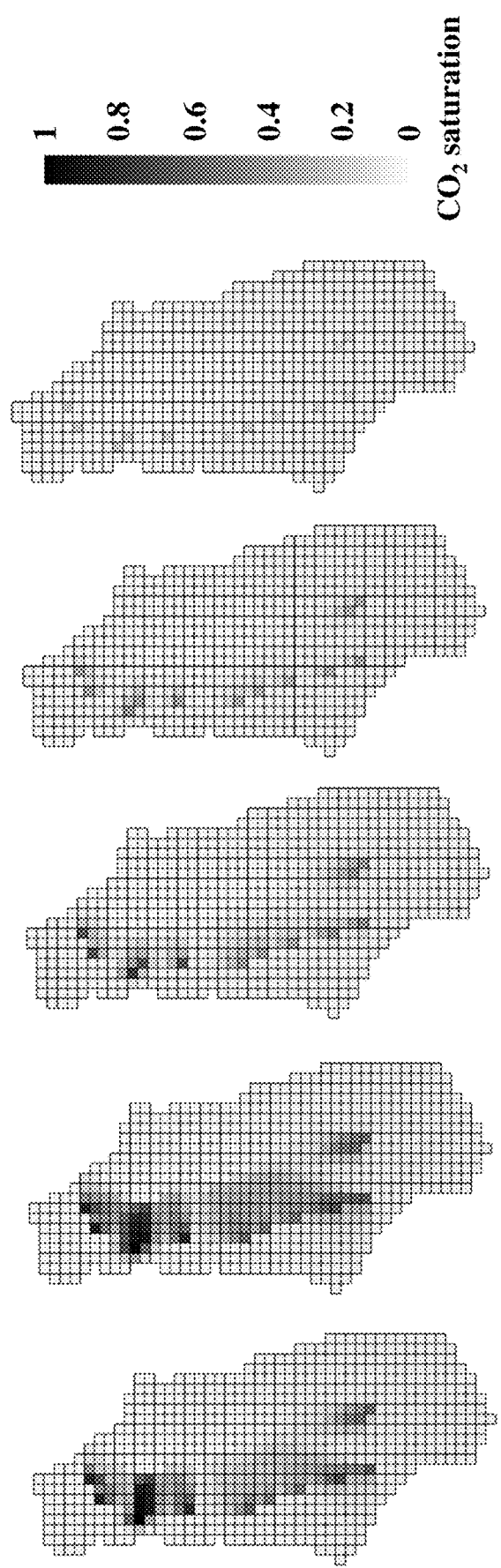
FIG. 14B displays a top view of top to bottom zones/layers of a reservoir model of a third simulation showing $CO_2$ saturation after 16 years of $CO_2$-EGR in 2037, in accordance with embodiments.
Figure 14C:
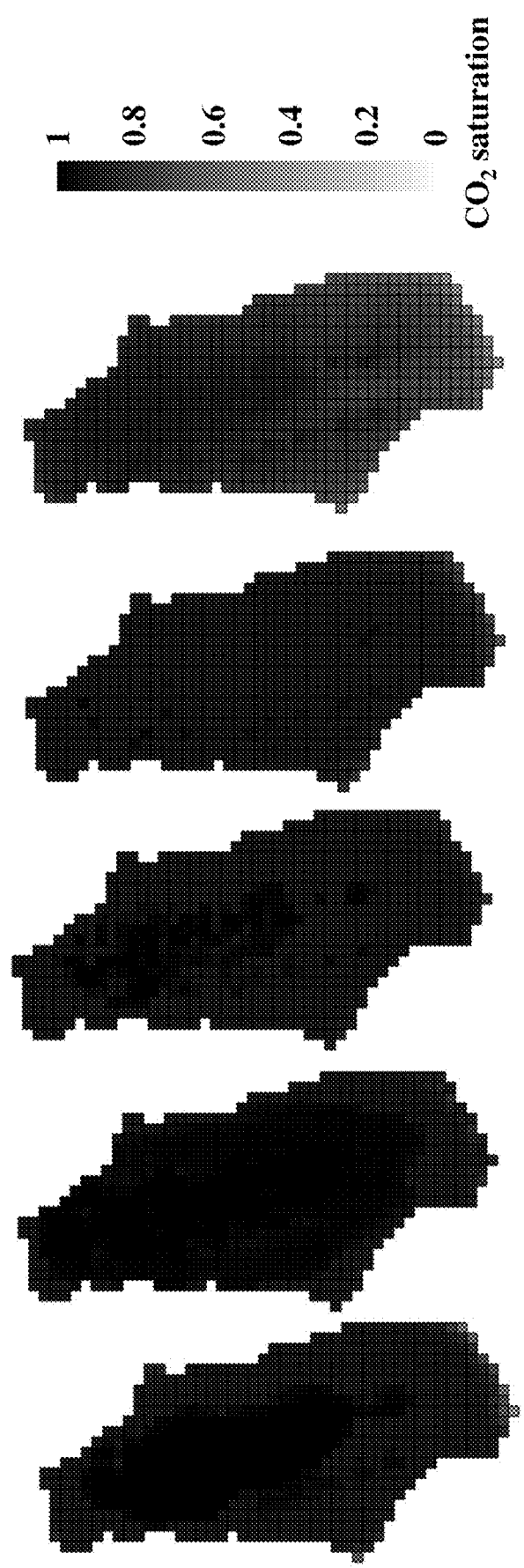
FIG. 14C displays a top view of top to bottom zones/layers of a reservoir model of a third simulation showing $CO_2$ saturation after 20 years of $CO_2$ storage in 2057, in accordance with embodiments.
Figure 14D:
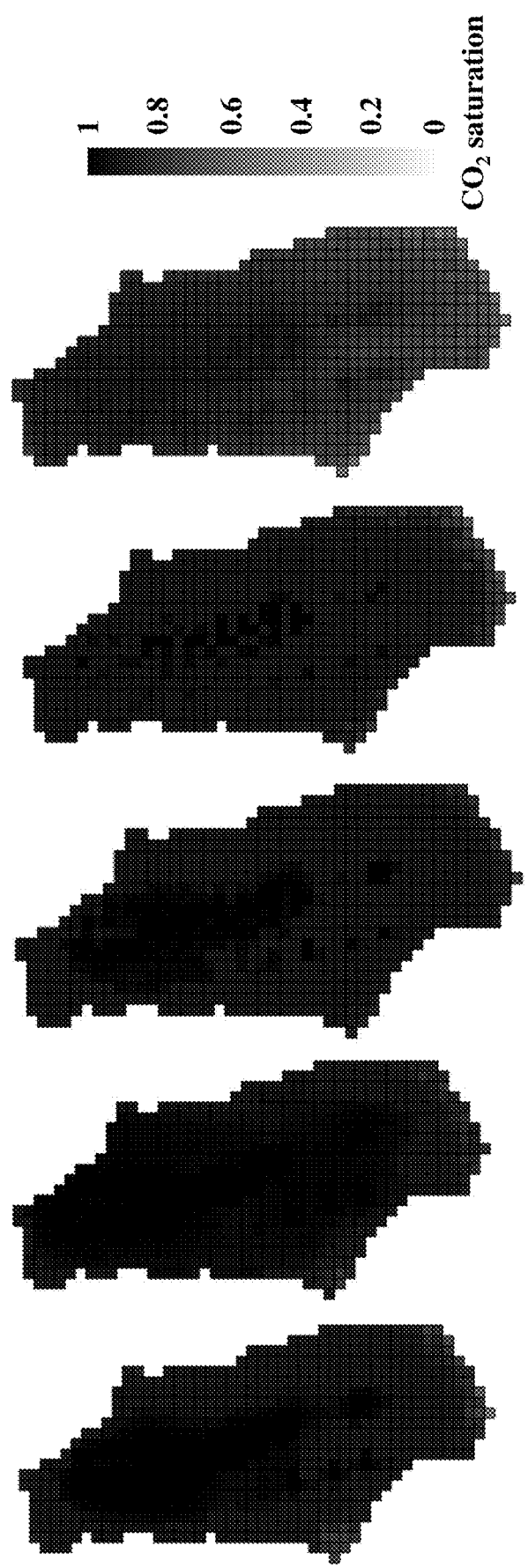
FIG. 14D displays a top view of top to bottom zones/layers of a reservoir model of a third simulation showing $CO_2$ saturation after 50 years of $CO_2$ heat mining in 2107, in accordance with embodiments.
Figure 15B:
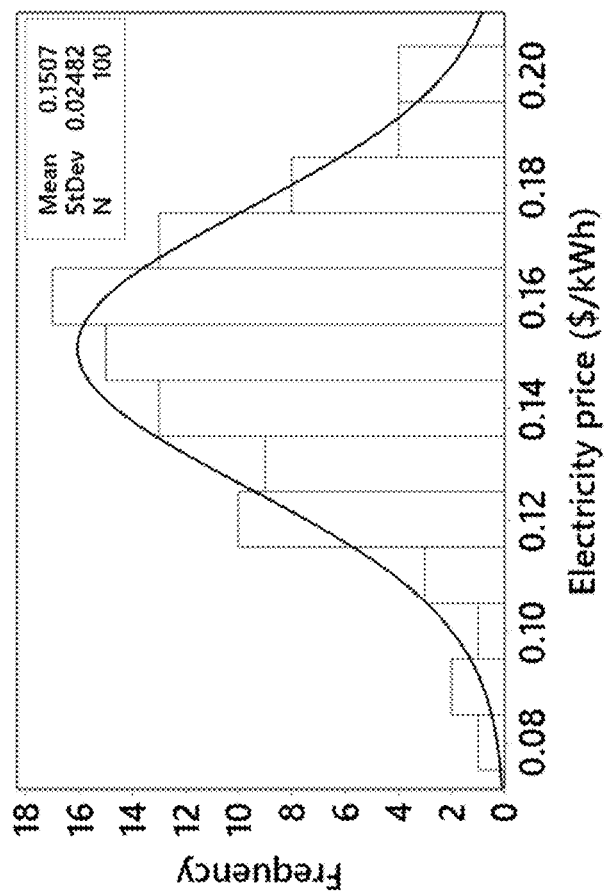
FIG. 15B displays a graphical presentation of electricity price of cost per kilowatt hour ($/kWh) for a reservoir economic assessment model, in accordance with embodiments.
Figure 15A:
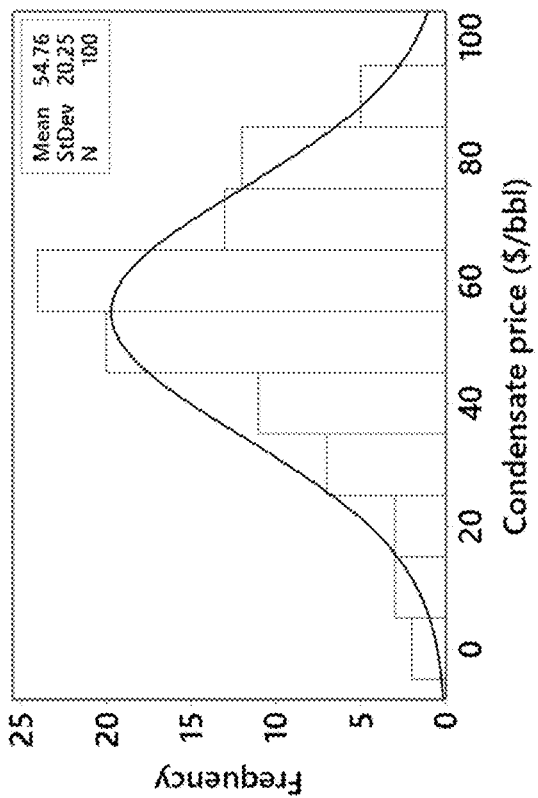
FIG. 15A displays a graphical presentation of condensate price in cost per barrel of oil ($/bbl) for a reservoir economic assessment model, in accordance with embodiments.
Figure 15D:
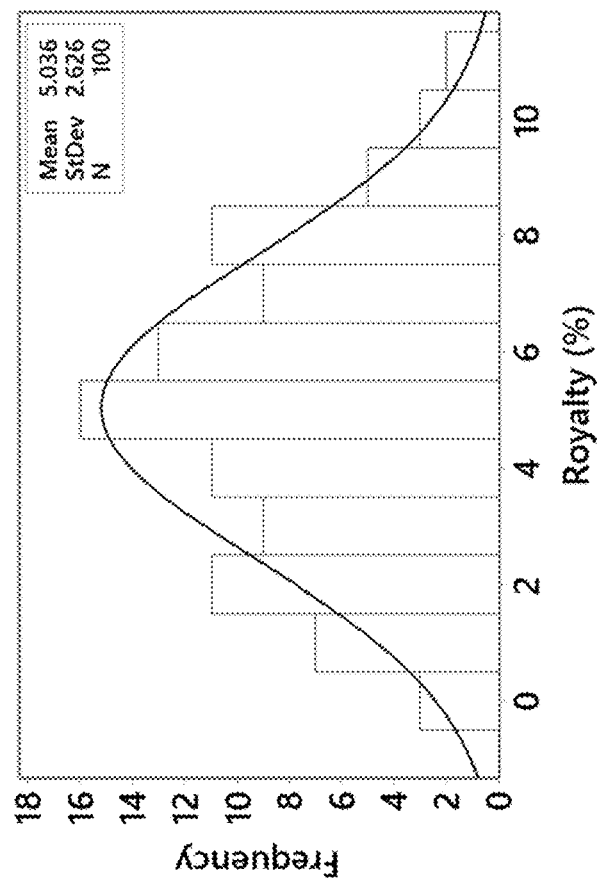
FIG. 15D displays a graphical presentation of royalty in percent (%) for a reservoir economic assessment model, in accordance with embodiments.
Figure 15C:
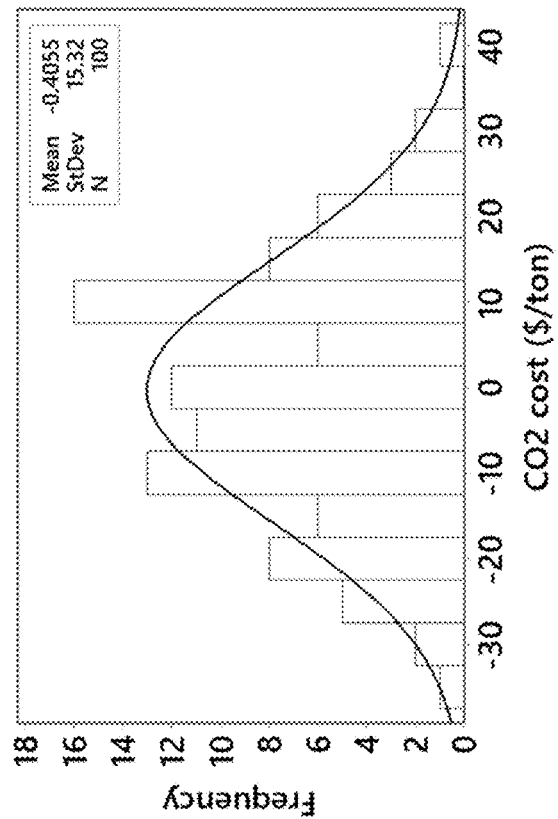
FIG. 15C displays a graphical presentation of $CO_2$ cost in cost per ton ($/ton) for a reservoir economic assessment model, in accordance with embodiments.
Figure 15F:
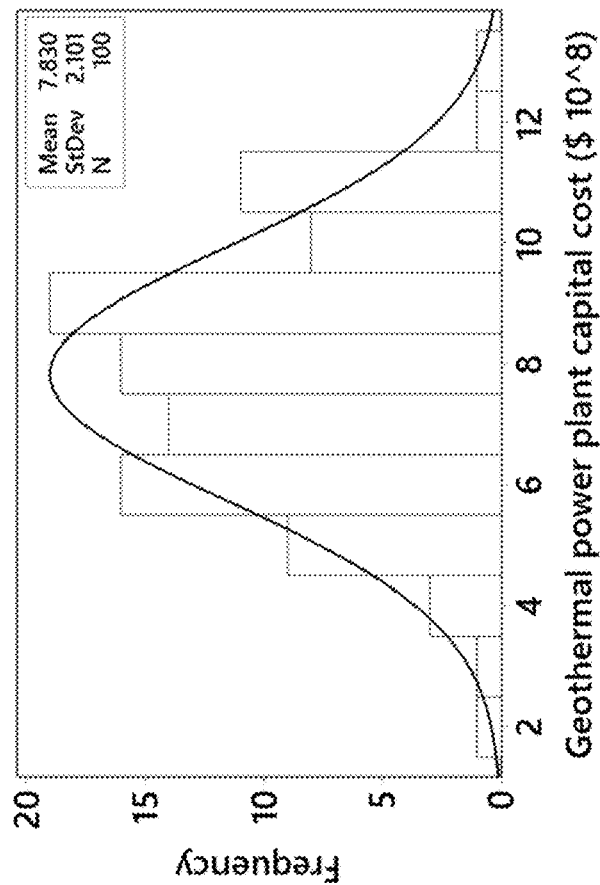
FIG. 15F displays a graphical presentation of geothermal power plant capital cost ($10^8) for a reservoir economic assessment model, in accordance with embodiments.
Figure 15E:
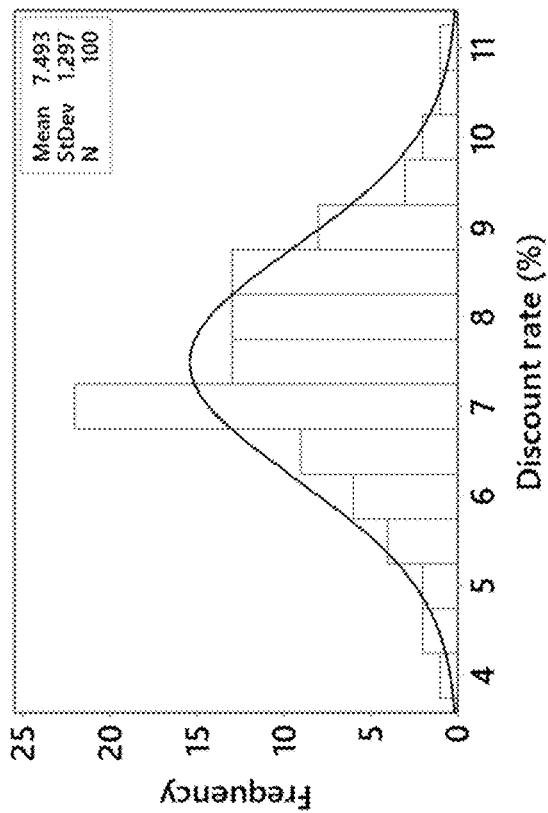
FIG. 15E displays a graphical presentation of discount rate (%) for a reservoir economic assessment model, in accordance with embodiments.
Figure 15H:
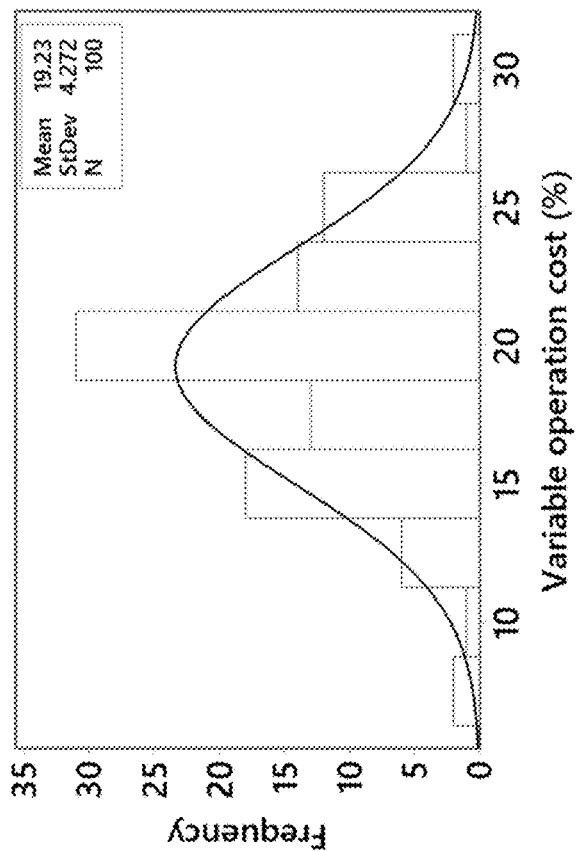
FIG. 15H displays a graphical presentation of variable operation cost (%) for a reservoir economic assessment model, in accordance with embodiments.
Figure 15G:
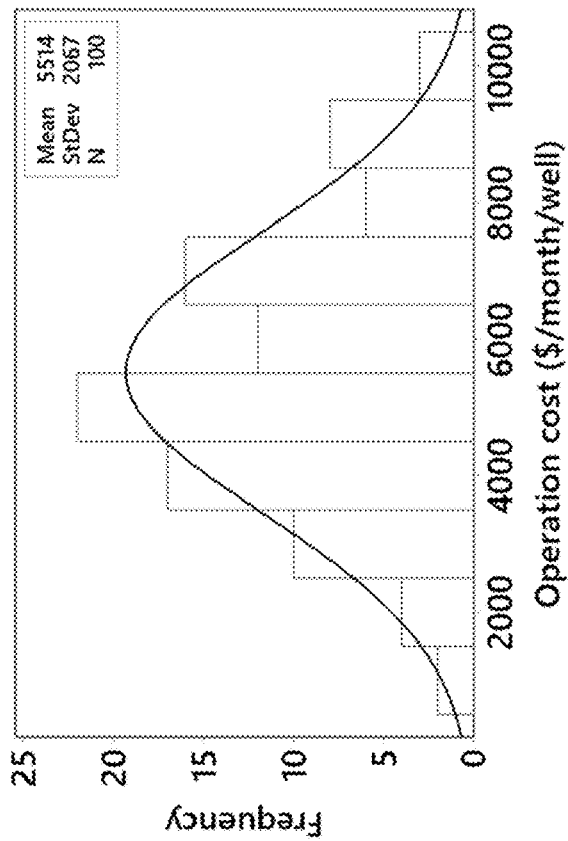
FIG. 15G displays a graphical presentation of operation cost ($/month/well) for a reservoir economic assessment model, in accordance with embodiments.
Figure 15I:
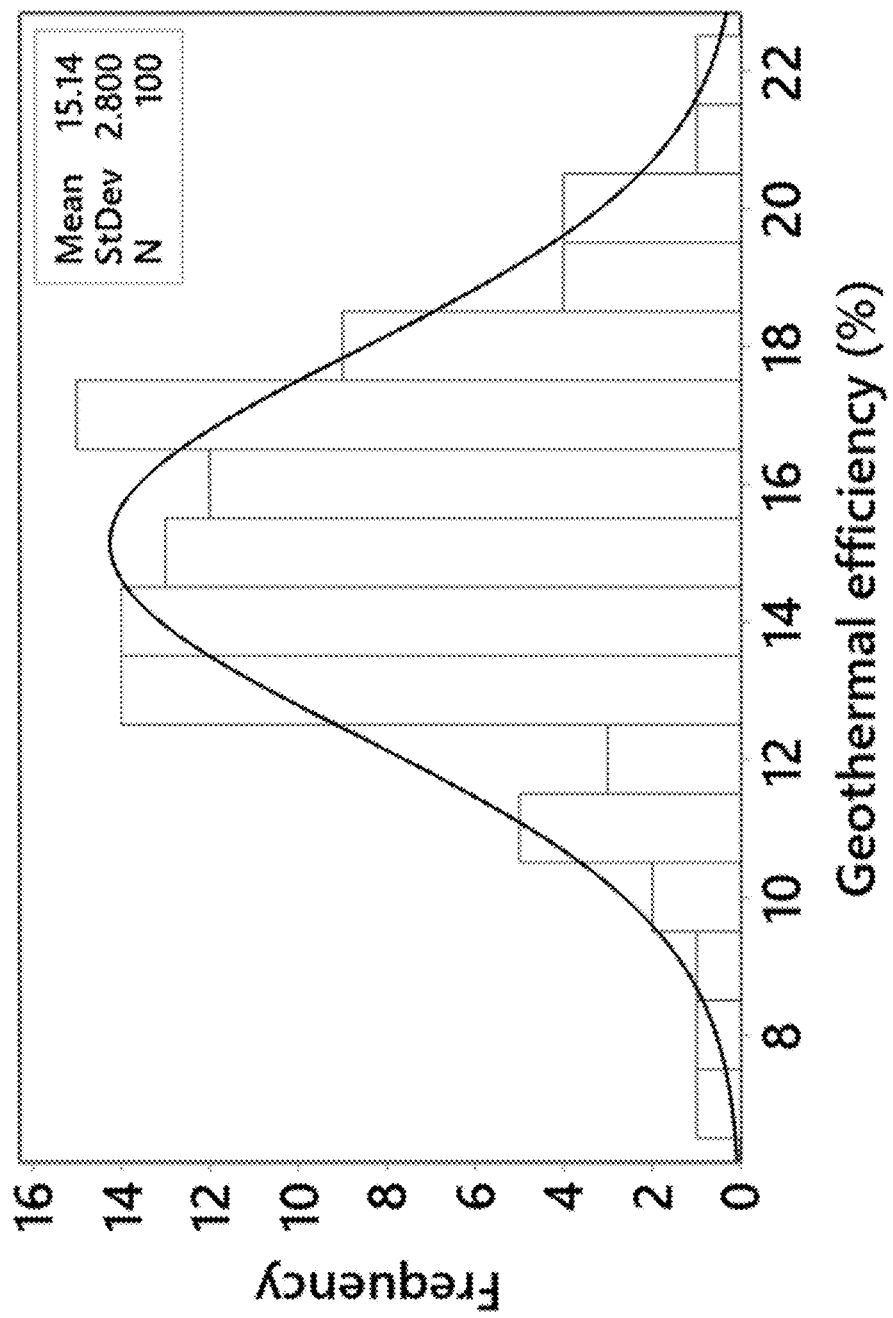
FIG. 15I displays a graphical presentation of geothermal efficiency (%) for a reservoir economic assessment model, in accordance with embodiments.

The $CO_2$ saturation in Case 3 at different stages is given in FIGS. 14A-D, where low $CO_2$ saturation is represented by shading on the bottom end of the scales and high $CO_2$ saturation is represented by shading on the top end of the scales. The $CO_2$ saturation in Case 3 shown in FIGS. 14A, 14B, and 14C are same as the $CO_2$ saturation in Case 1 in FIGS. 13A, 13B, and 13C. In Case 3, subsequent $CO_2$ heat mining is run after the $CO_2$ storage. There is 1.2 Gt of $CO_2$ in the Arun reservoir prior to the $CO_2$ heat mining. The recycling $CO_2$ rate is 178,000 ton/d during $CO_2$ heat mining which is small compared to the 1.2 Gt of $CO_2$ already stored in the reservoir. The $CO_2$ saturation at the end of heat mining in FIG. 14D is close to the $CO_2$ saturation in FIG. 14C.

Simulation results are presented in Table 9. In Case 1, there is additional condensate production during heat mining between 2037 to 2087. Cumulatively amount of 52.73 MMbbl of condensate is produced with 51.31 MMbbl of condensate produced during $CO_2$ EGR. Additional condensate (1.42 MMbbl) is produced during heat mining. A maximum amount of 1.2 Gt of $CO_2$ is stored, which is the same in all three cases. In Case 3, $CO_2$ heat mining is run after the $CO_2$ storage. There is 1.2 Gt of $CO_2$ in the reservoir and 58 MMbbl of condensate remaining in the reservoir when the $CO_2$ heat mining starts. No additional condensate (1.4 MMbbl) is produced during heat mining, possibly due to the small condensate volume relative to the 1.2 Gt $CO_2$ already stored in the reservoir.

For heat mining, the following equation is used to calculate the geothermal heat recoverable:

$$Q_{heat\ mining} = \rho_{CO_2} \cdot V_{CO_2} \cdot C_{CO_2} \cdot (T_{wellhead} - T_0)$$

where $Q_{heat\ mining}$ is the heat mined in J; $\rho_{CO_2}$ is the density of $CO_2$ at the surface condition in kg/m³; $V_{CO_2}$ is the volume of the $CO_2$ production in Sm³; $C_{CO_2}$ is the heat capacity of the $CO_2$ in J/(kg·° C.); $T_{wellhead}$ is the production fluid temperature at the wellhead in ° C.; $T_0$ is the reference temperature in ° C. In this study, the production fluid at the wellhead has a temperature of 310° F. (154.4° C.). 60° F. (15.6° C.) is used as the reference temperature.

By comparing Case 1 with Case 3, it can be seen that $CO_2$ storage prior to the heat mining helps to build up reservoir pressure. A larger $CO_2$ production can be achieved in Case 3 at the beginning of the heat mining process. Therefore, a larger amount (12% more) of heat ($2.02 \times 10^{11}$ kWh) can be mined in 50 years by recycling $CO_2$ compared to Case 1.

TABLE 9

Summary of results of different cases

| Simulations | Case 1 | Case 2 | Case 3 |
|---|---|---|---|
| Condensate production (MMbbl) | 52.73 | 51.31 | 51.31 |
| $CO_2$ stored (Gt) | 1.20 | 1.20 | 1.20 |
| Electricity generated by heat mining (kWh) | $1.79 \times 10^{11}$ | N/A | $2.02 \times 10^{11}$ |

Economic Analysis

In an embodiment, an economic assessment model is developed to evaluate the profits from $CO_2$ EGR combined with $CO_2$ storage and heat mining. The best economic case is defined by a NPV calculation in Equation (4). The economic parameters in the NPV are given in Table 10. The profit comes from the condensate and electricity sales. $CO_2$ storage can generate revenue in the case that $CO_2$ carbon tax is included, making $CO_2$ cost negative.

TABLE 10

Parameters of economic analysis
Variables

| Condensate price ($/bbl) | 0-100 |
|---|---|
| Electricity price ($/kWh) | [0.1-0.2] |
| $CO_2$ cost ($/ton) | [-30, 30] |
| Royalty (%) | 0-10 |
| Discount rate (%) | 5-10 |
| Geothermal power plant ($) | $[3.75, 12.6] \times 10^8$ |
| Fixed cost ($/month/well) | 1,000-10,000 |
| Variable cost (%) | 10-30 |
| Efficiency of geothermal power plant (%) | 10-20 |

Capital expenditure for the geothermal power plant is needed to generate electricity from $CO_2$ heat mining. In an embodiment, $CO_2$ heat mining of $2.02 \times 10^{11}$ of kWh (Table 9) is designed for 50 years. A 450 MW geothermal power plant using flashed steam (>150° C.) is proposed for the Arun field. The current capacity of geothermal power plants in Indonesia is between 2.5 and 1,533.5 MW. Two dry steam geothermal plants exist, including the Kamojang and Darajat plants with capacities of 235 MW and 270 MW, respectively. Details of capital expenditure of the geothermal power plant are summarized in Table 11. There is a 44% cost discount in the capital cost due to the existence of the Arun field infrastructure such as, for example, exploration data, wells, facilities, access roads, management and engineering teams, insurances, etc.

TABLE 11

Geothermal project in Arun field

Typical geothermal power plant capital cost in Indonesia

| Power plant, steam field development/Power plant and surface installations | 56% |
|---|---|
| Drilling wells/Exploration, drilling, stimulation | 24% |
| Infrastructure/Interconnection | 7% |
| Project management and engineering supervision/Planning, management, land | 3% |
| Others/Insurance | 10% |

Geothermal project in Arun field

| Capital cost ($/kW) | 1500-5050 |
|---|---|
| Installed flash steam geothermal capacity in Arun field (MW) | 450 |
| Capital cost for geothermal power plant with 44% discount ($) | $[3.75, 12.6] \times 10^8$ |

The well operating cost breakdown is shown in Table 12. Empirical monthly well operating cost varies from $1,000 to $10,000. An extra variable cost is assumed to cover the $CO_2$ injection induced well services such as, for example, wireline service, wells workover, equipment rentals, corrosion, etc.

TABLE 12

Typical monthly operating cost per well in the oil and gas industry

| Typical monthly operating cost per well ($/month/well) | Low | High |
|---|---|---|
| Labours & Operation | 121 | 5311 |
| Repairs & Maintenance | 451 | 2413 |
| Fuel & Utilities | 145 | 534 |
| Chemicals & Equipment | 175 | 668 |
| Regulatory & Land | 113 | 1075 |
| Total monthly expense per well | 1003 | 10001 |

Figure 16B:
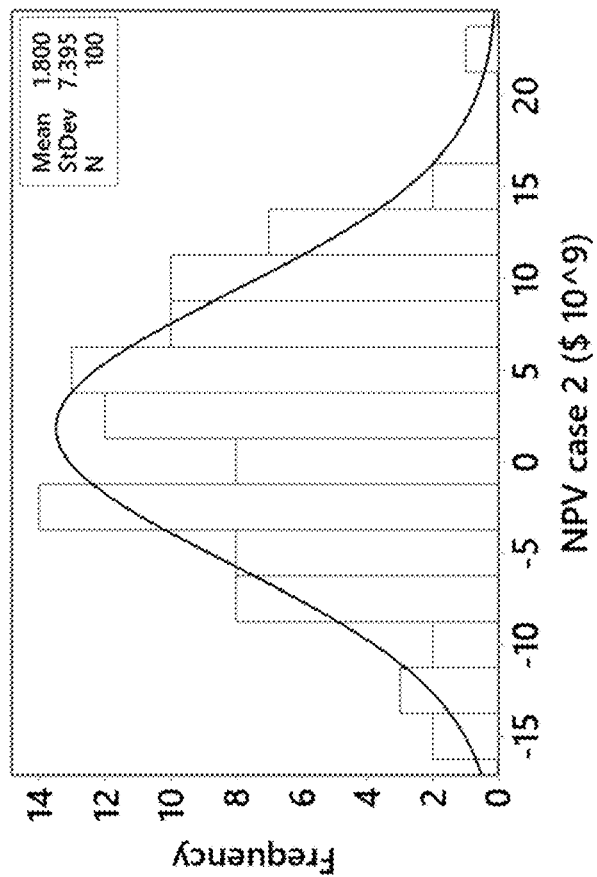
FIG. 16B displays a graphical presentation of net present value (NPV) ($10$^9$) for a second simulation, in accordance with embodiments.
Figure 16A:
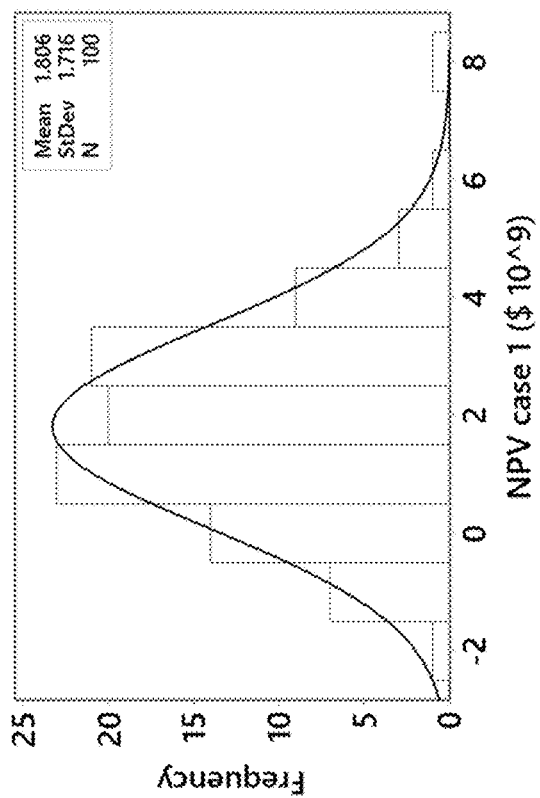
FIG. 16A displays a graphical presentation of net present value (NPV) ($10$^9$) for a first simulation, in accordance with embodiments.
Figure 16C:
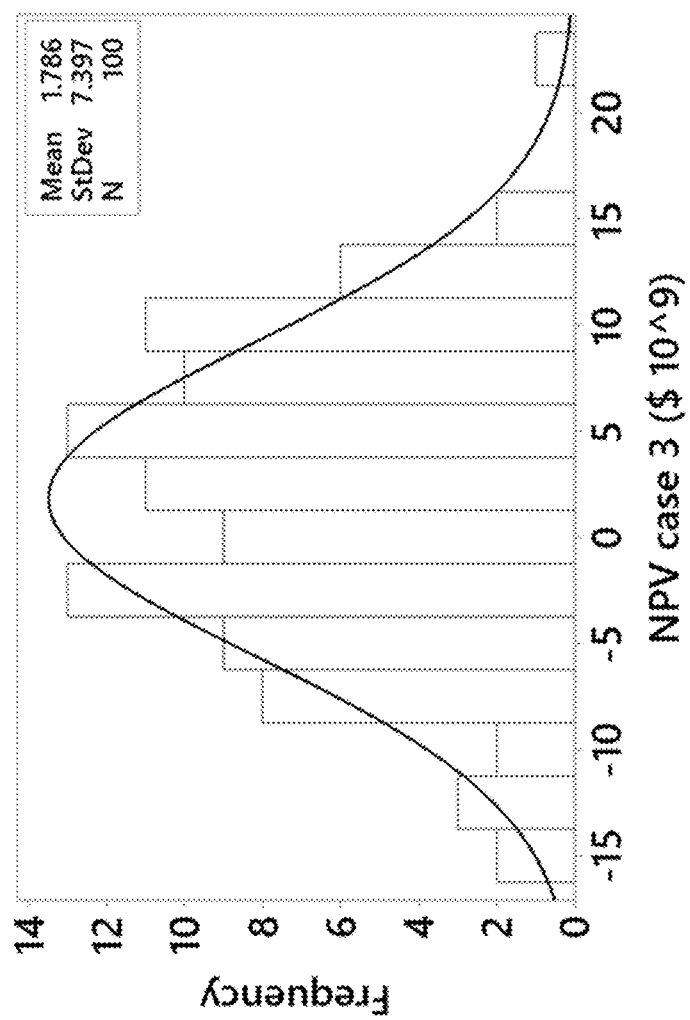
FIG. 16C displays a graphical presentation of net present value (NPV) ($10$^9$) for a third simulation, in accordance with embodiments.

A hundred random numbers are assigned to each parameter. The histogram of each parameter is presented in FIG. 15. The NPVs for the case studies are given in FIG. 16. The P10, P50, and P90 values are given in Table 13. Although the P50 of the NPV in these three cases are similar, NPV of Case 1 has a narrower distribution than the NPV of Case 2 and Case 3. The NPV of Case 2 and Case 3 are similar. The difference is caused by additional revenue generated by the $CO_2$ heat mining.

TABLE 13

NPV results ($)

| Case | P10 | P50 | P90 |
|---|---|---|---|
| 1 | $-3.22 \times 10^8$ | $1.75 \times 10^9$ | $3.80 \times 10^9$ |
| 2 | $-7.84 \times 10^9$ | $1.85 \times 10^9$ | $1.07 \times 10^{10}$ |
| 3 | $-7.83 \times 10^9$ | $1.81 \times 10^9$ | $1.07 \times 10^{10}$ |

Figure 17A:
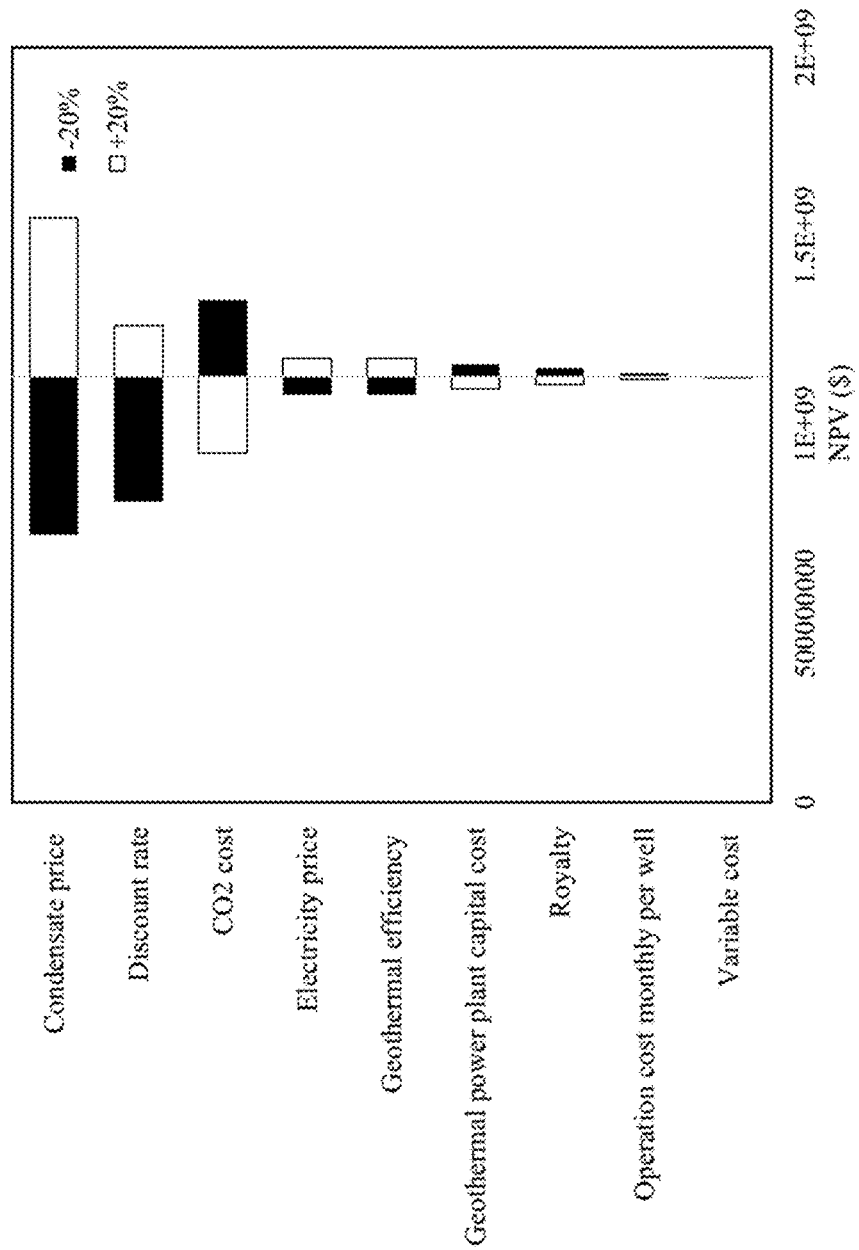
FIG. 17A displays a graphical presentation of sensitivity analysis of a reservoir economic assessment model for a first simulation, in accordance with embodiments.
Figure 17B:
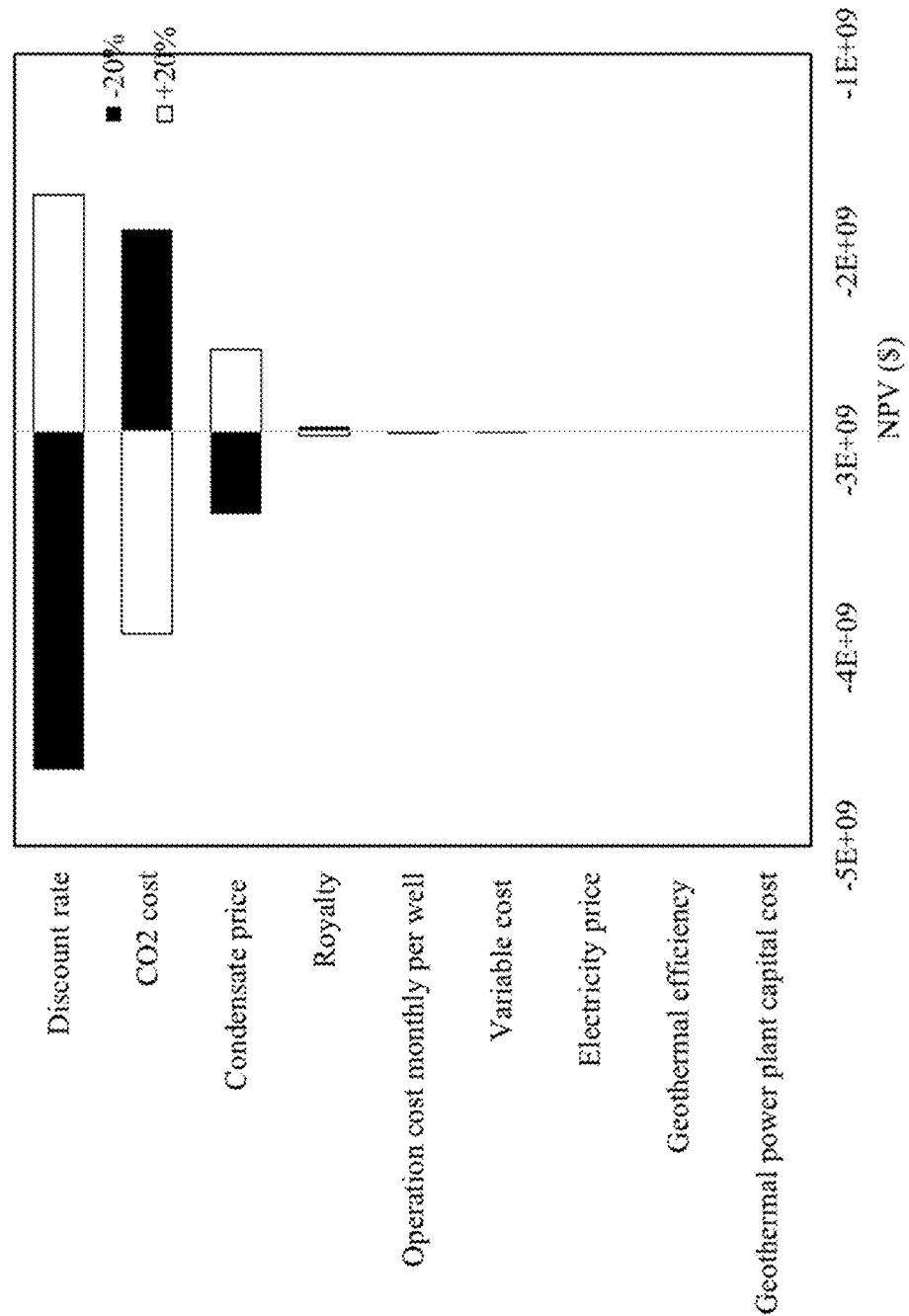
FIG. 17B displays a graphical presentation of sensitivity analysis of a reservoir economic assessment model for a second simulation, in accordance with embodiments.
Figure 17C:
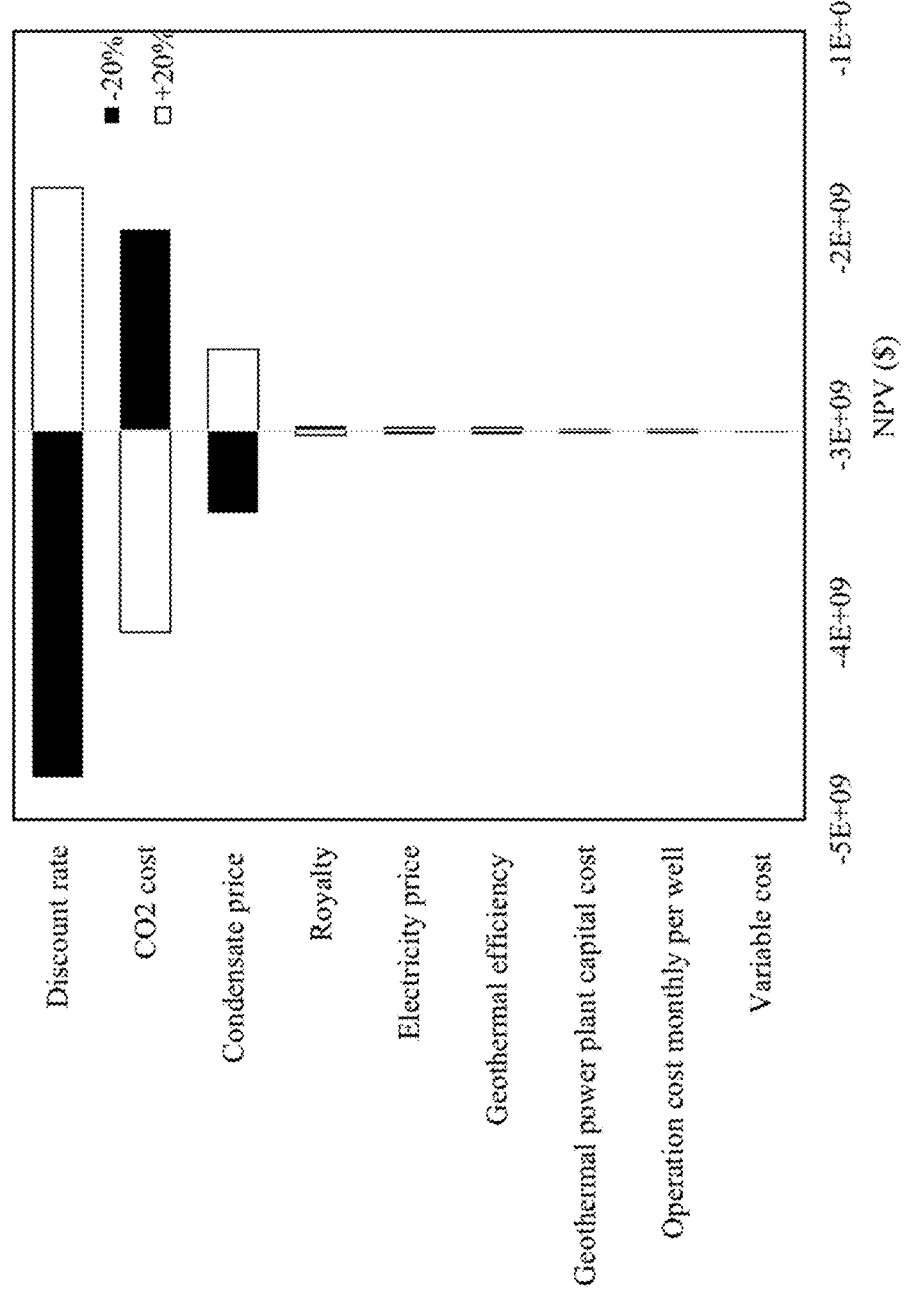
FIG. 17C displays a graphical presentation of sensitivity analysis of a reservoir economic assessment model for a third simulation, in accordance with embodiments.

In order to determine the impact of each parameter on the NPV, tornado charts are used (FIG. 17). Condensate price, $CO_2$ cost, and discount rate have larger impacts than others on the NPV for all three cases.

Figure 18A:
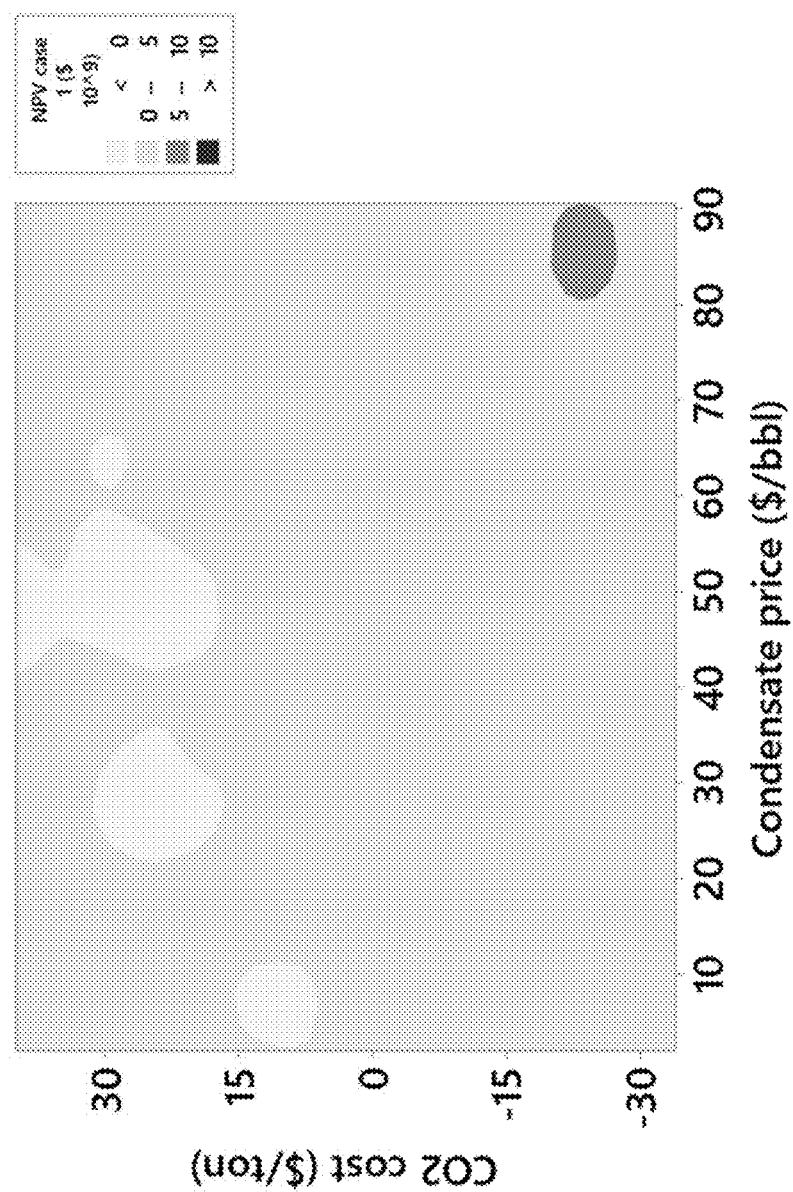
FIG. 18A displays a graphical presentation of NPV ($10$^9$) in relation to $CO_2$ cost ($/ton) and condensate price ($/bbl) of a first simulation, in accordance with embodiments.
Figure 18B:
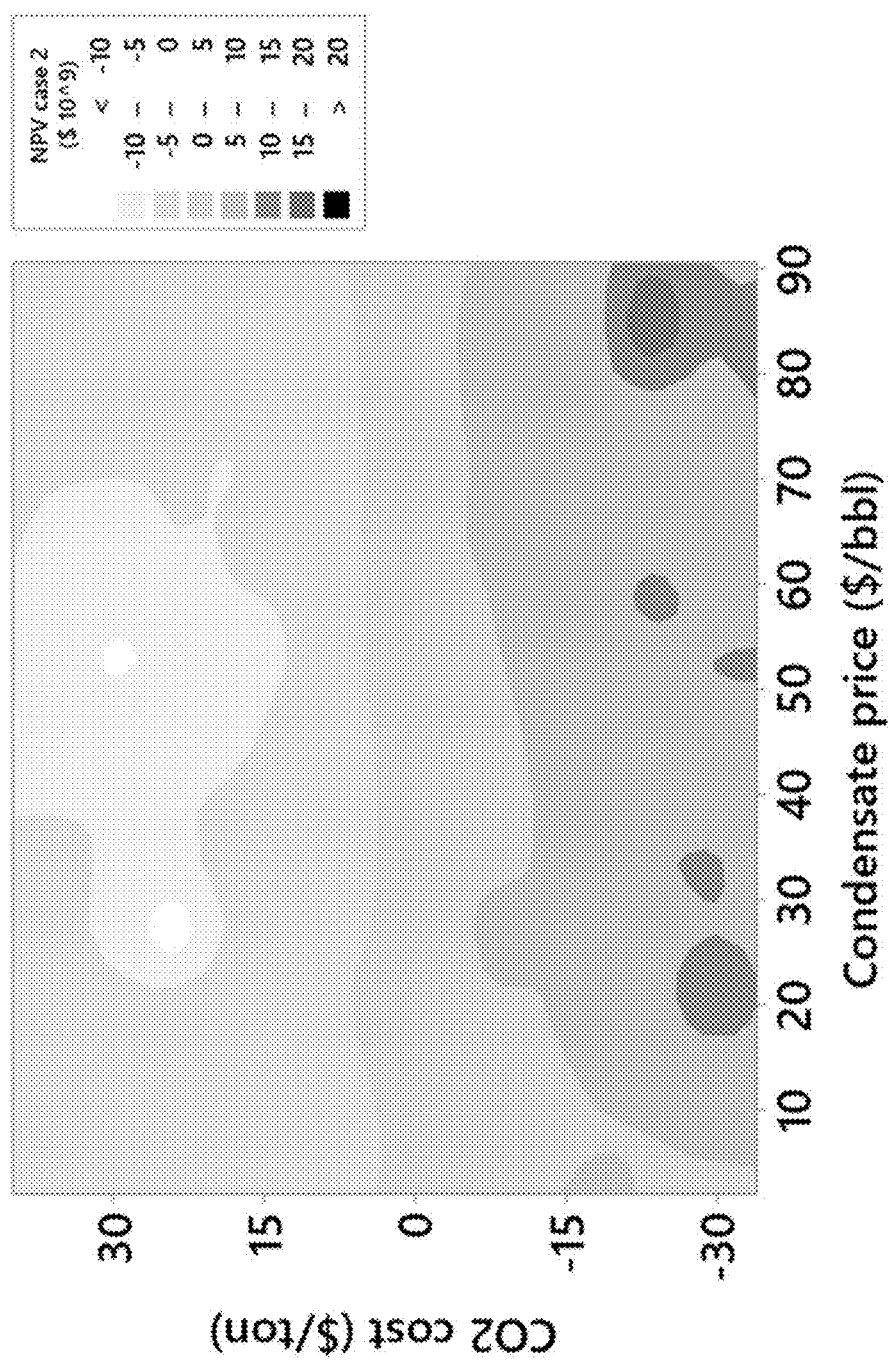
FIG. 18B displays a graphical presentation of NPV ($10$^9$) in relation to $CO_2$ cost ($/ton) and condensate price ($/bbl) of a second simulation, in accordance with embodiments.
Figure 18C:
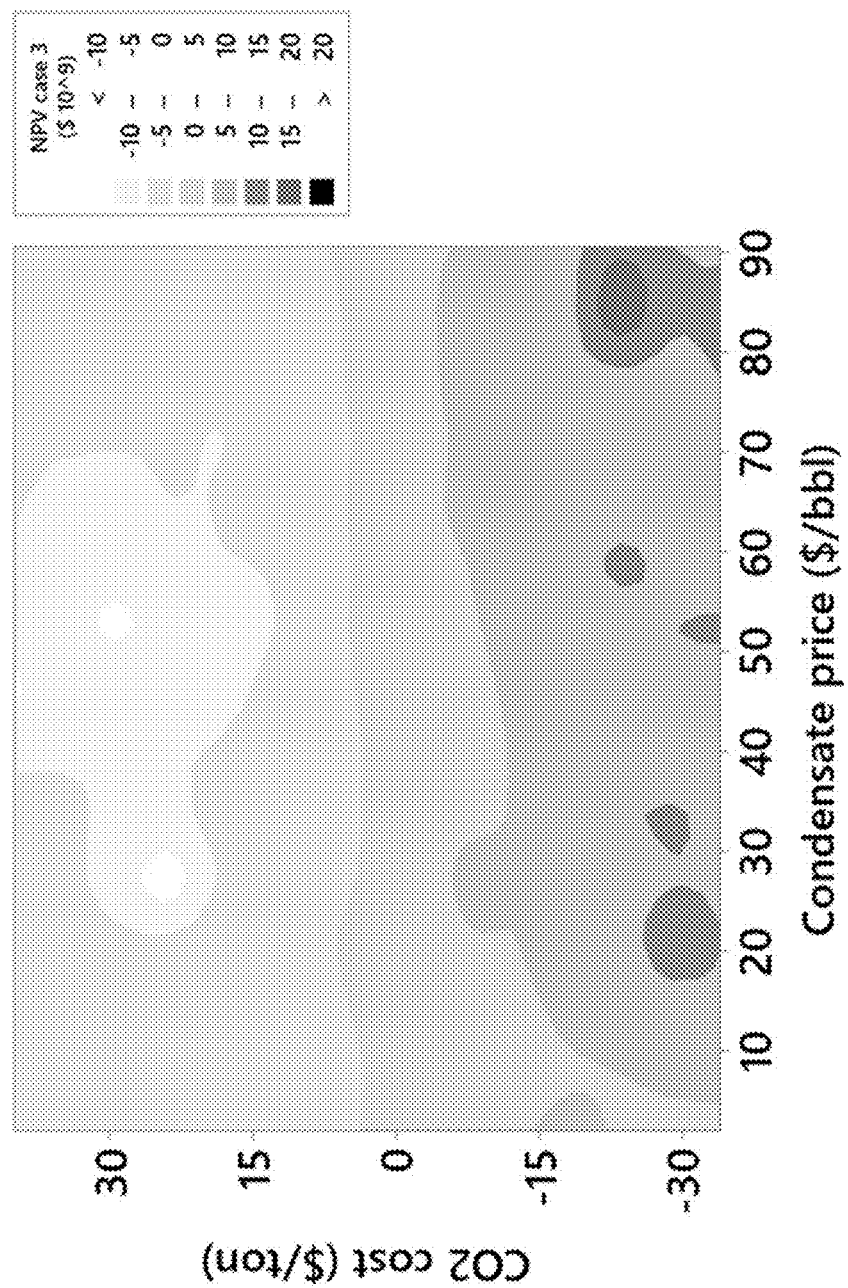
FIG. 18C displays a graphical presentation of NPV ($10$^9$) in relation to $CO_2$ cost ($/ton) and condensate price ($/bbl) of a third simulation, in accordance with embodiments.

The condensate price and $CO_2$ cost vary daily with market changes. The contour map of NPV for all three cases is shown in FIGS. 18A-18C, where low NPV is represented by shading on the top end of the scales and high NPV is represented by shading on the bottom end of the scales. The NPV of Case 1 has much less negative value than the NPV of Case 2 and 3, which is consistent with the distribution of NPV in FIG. 16. The negative NPV of Case 1 occurs when the $CO_2$ cost is high and the condensate price is low. The discontinuous color bubble shows the impact of other parameters on the NPV. The contour maps are similar for Case 2 and Case 3. The minor difference is caused by $CO_2$ heat mining.

The sequence of the $CO_2$ EGR, heat mining and storage makes a difference in NPV. The NPV is evaluated with $CO_2$ storage amount of 1.2 Gt. The NPV is broken down from the process of $CO_2$ EGR, heat mining, and storage. One example is shown in Table 14 to evaluate the amount of $CO_2$ that can be stored by the profits from the $CO_2$ EGR and the heat mining process.

TABLE 14

Parameters of economic analysis Variables

| | |
|---|---|
| Condensate price ($/bbl) | 60 |
| Electricity price ($/kWh) | 0.15 |
| $CO_2$ cost ($/ton) | −30, 0, 30 |
| Royalty (%) | 5 |
| Discount rate (%) | 7 |
| Geothermal power plant ($) | $5 \times 10^8$ |
| Fixed cost ($/month/well) | 3,000 |
| Variable cost (%) | 20 |
| Efficiency of geothermal power plant (%) | 15 |

Figure 19:
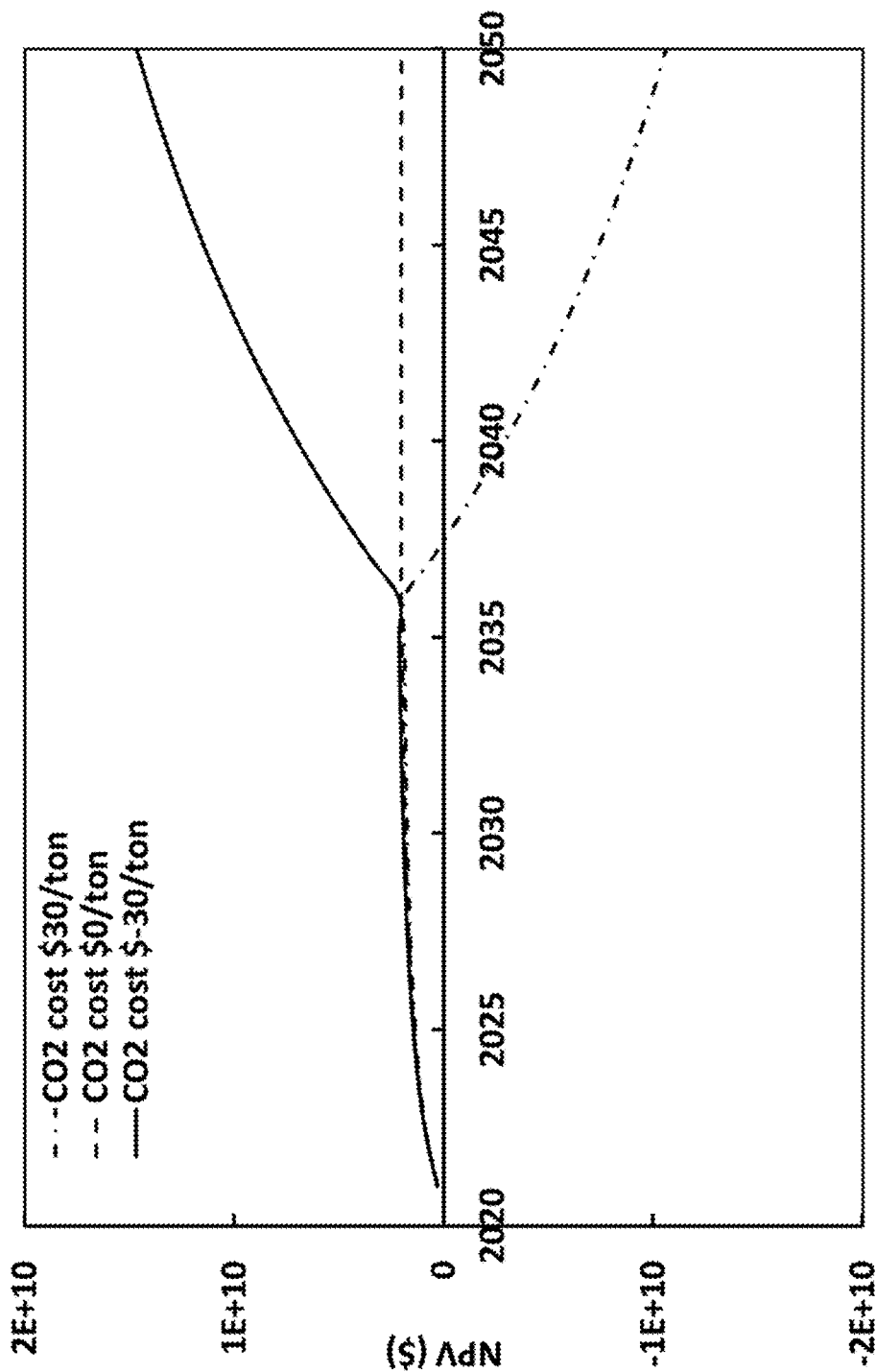
FIG. 19 displays a graphical presentation of NPV ($) of $CO_2$ storage after EGR for a second simulation, in accordance with embodiments.

In Case 2, when $CO_2$ cost ranges from $30/ton to $-30/ton, the NPV of $CO_2$ storage is given in FIG. 19. 51.31 MMbbl of condensate is produced during the $CO_2$ EGR generating a profit of $1,910 MM at a condensate price if $60/bbl and $CO_2$ cost of $30/ton. If this profit is used for $CO_2$ storage, 205 Mt $CO_2$ can be stored to achieve zero NPV in two years. When $CO_2$ cost is −$30/ton, $CO_2$ storage can generate more profit and storing 1.2 Gt of $CO_2$ generates a NPV of $1.73×10^{10} (Table 15).

Figure 20:
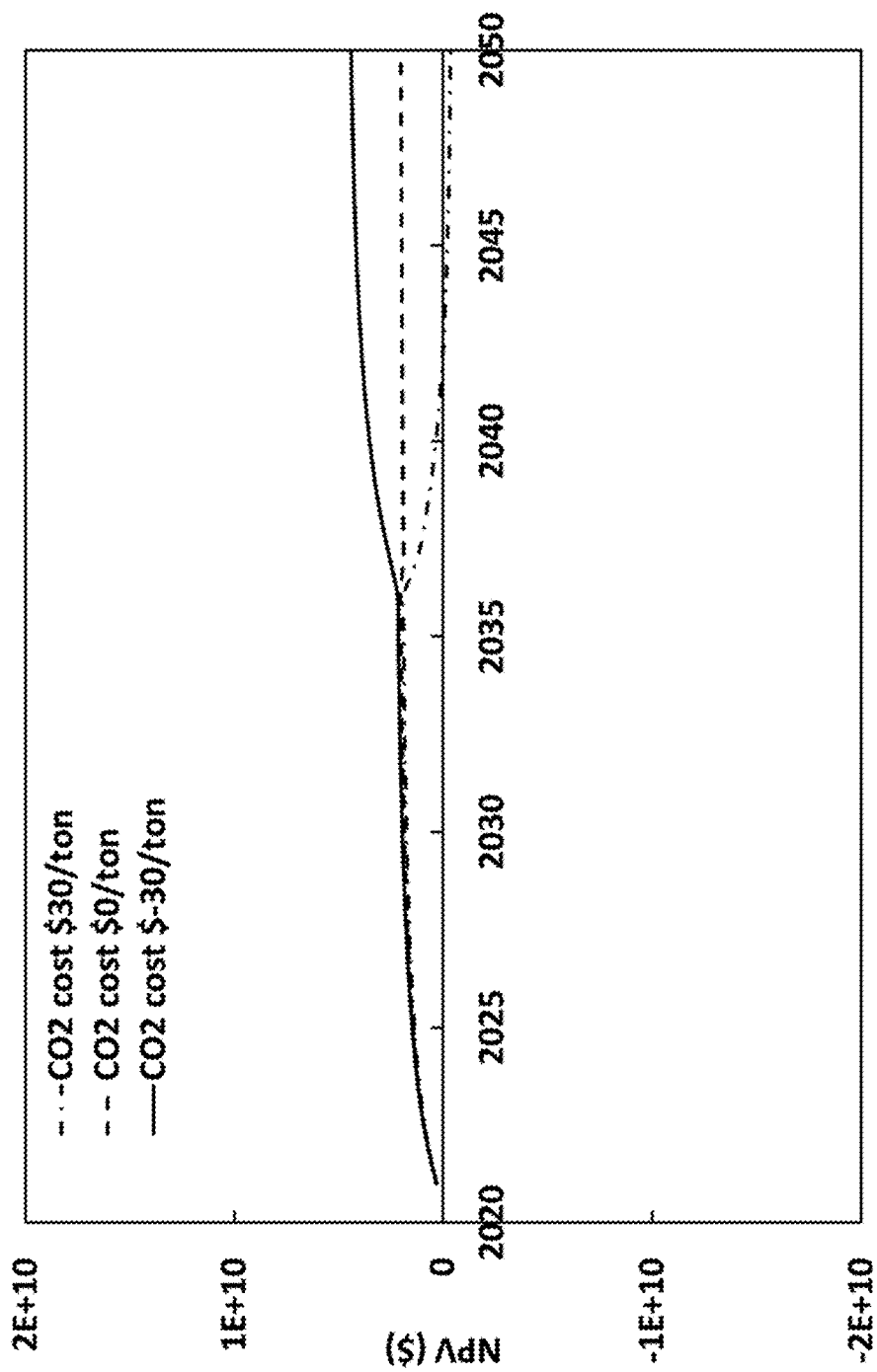
FIG. 20 displays a graphical presentation of NPV ($) of $CO_2$ heat mining after EGR for a first simulation, in accordance with embodiments.

In Case 1, when $CO_2$ cost ranges from $30/ton to −$30/ton, the NPV of $CO_2$ heat mining is given in FIG. 20. At a condensate price of $60/bbl and a $CO_2$ cost of $30/ton, the NPV generated by condensate recovery is $1,910 MM. If this profit is used for $CO_2$ heat mining, $1.1×10^{10}$ kWh of electricity can be generated to achieve zero NPV in seven years.

The NPV results of Cases 1, 2 and 3 are given in Table 15. $CO_2$ injection for EGR is firstly simulated between 2021 to 2037. Condensate is produced in this process. In all three cases, the NPV of EGR in 2037 is $1.91×10^9$, $2.05×10^9$, and $2.18×10^9$ with a $CO_2$ cost of $30/ton, $0/ton, and −$30/ton, respectively.

In Case 1, when $CO_2$ cost is $30/ton, the NPV drops to −$3.66×10^8$ at the end of $CO_2$ heat mining in 2087. At the end of $CO_2$ storage, the NPV becomes −$8.94×10^8$. However, when $CO_2$ cost is $0/ton, the NPV is $2.14×10^9$ at the end of the project. If $CO_2$ cost is −$30/ton, representing a $CO_2$ credit of $30/ton, a NPV of $5.17×10^9$ can be obtained at the end of $CO_2$ storage in 2107. In Cases 2, the NPV drops to −$1.33×10^{10}$ at the end of $CO_2$ storage in 2057 if the $CO_2$ cost is $30/ton. If the $CO_2$ cost is $0/ton, the NPV at the end of $CO_2$ storage in 2057 is $2.04×10^9$, which is smaller than the NPV of $2.14×10^9$ at the end of Case 1. The difference is caused by the profits from the $CO_2$ heat mining. In Case 3, $CO_2$ heat mining is run after $CO_2$ storage. A negative NPV of −$1.32×10^{10}$ is obtained at the end of the project if $CO_2$ cost is $30/ton. If the $CO_2$ cost is $0/ton, the NPV of $2.08×10^9$ is obtained at the end of project in 2107. The NPV is bigger than $2.04×10^9$ in Case 2 and smaller than $2.14×10^9$ in Case 1. If the $CO_2$ cost is −$30/ton, a NPV of $1.74×10^{10}$ can be obtained at the end of the project in 2107, which is the largest NPV among the three cases.

$CO_2$ cost affects the performance of $CO_2$ EGR, heat mining, and storage. A goal is to achieve the highest NPV at different $CO_2$ cost scenarios. Results of the simulations are given below.

If the $CO_2$ cost is $30/ton, $CO_2$ injection in the Arun reservoir is used for EGR and stopped in 2037. A positive NPV of $1.91×10^9$ is obtained which can be used to store 205 Mt $CO_2$ in 2 years. Consequently, stopping Case 2 after 2 years of $CO_2$ storage will give a NPV of zero. If the $CO_2$ cost is $0/ton, Case 1 is the best. If the $CO_2$ cost is −$30/ton, Case 3 is the best. Case 3 is better than Case 1 although the same amount (1.2 Gt) of $CO_2$ is stored due to discounting.

TABLE 15

Economic analysis of different cases

Case 1 NPV ($)

| $CO_2$ cost | EGR (2037) | Heat mining (2087) | Storage (2107) |
|---|---|---|---|
| $30/ton | 1.91E+09 | −3.66E+08 | −8.94E+08 |
| $0/ton | 2.05E+09 | 2.14E+09 | 2.14E+09 |
| −$30/ton | 2.18E+09 | 4.64E+09 | 5.17E+09 |

Case 2 NPV ($)

| $CO_2$ cost | EGR (2037) | Storage (2057) | N/A |
|---|---|---|---|
| $30/ton | 1.91E+09 | −1.33E+10 | N/A |
| $0/ton | 2.05E+09 | 2.04E+09 | N/A |
| −$30/ton | 2.18E+09 | 1.73E+10 | N/A |

Case 3 NPV ($)

| $CO_2$ cost | EGR (2037) | Storage (2057) | Heat mining (2107) |
|---|---|---|---|
| $30/ton | 1.91E+09 | −1.33E+10 | −1.32E+10 |
| $0/ton | 2.05E+09 | 2.04E+09 | 2.08E+09 |
| −$30/ton | 2.18E+09 | 1.73E+10 | 1.74E+10 |

Risk Analysis

The success of a CCS project depends on overcoming a number of risks, such as technical risks, policy risks, environmental risks, financial and government incentives, etc. In addition to the aforementioned simulation forecast and economic analysis, a partial list of major risks of CCS with EGR, heat mining, and geological storage in the Arun field are presented in Table 16.

TABLE 16

Partial list of potential technical and non-technical risks of CCS project in the Arun field

| Risk category | Risks | Economic impact |
|---|---|---|
| Technical | Integrating $CO_2$ capture to power or industry plants | Uncertainties of $CO_2$ supply may lengthen the Arun project and incur extra cost. |
| Technical | $CO_2$ transportation | Trucking, pipeline and temporary storage facility are required to handle the $CO_2$. They incur extra cost. |
| Technical | Project management | CCS pilots will be implemented and evaluated before full-field implementation. This will lengthen the project and incur extra cost. |
| Technical | Injection operation | Prevention of $CO_2$ corrosion in the injection facility will incur extra cost |
| Heath, safety and environment (HSE) | HSE training | Safety training, personal protective equipment and emergency plan are required. They will incur extra costs. |
| Policy | Future carbon credit | There is no carbon tax in Indonesia. Future carbon credit will have positive effects on project economics. |
| Community | Local community, local government, third part companies | Agreement between all the parties involved the project may bring extra cost. |
| Environmental | $CO_2$ leakage during capture, transportation, and storage | Prevention of $CO_2$ leakage during capture, transportation, and injection will incur extra cost. |
| Environmental | $CO_2$ containment in a geological formation | Continuous $CO_2$ plume monitoring will be needed. This will incur extra cost. |
| Financial | Bank debt | Intertest of bank loan is not included in the study, they will bring extra cost. |
| Social | Public acceptance | CCS project will create job opportunities to local community. |

Instead of performing a detailed reservoir simulation of each reservoir, the $CO_2$ storage potential can be estimated by the $CO_2$ density multiplied by the reservoir pore volume and recovery factor. The equation is described as follows:

$$m_{CO_2} = \rho_{CO_2} \times V_g \times B_g \times (R + R_{CO_2})$$

where $m_{CO_2}$ is the mass of the $CO_2$ storage; $\rho_{CO_2}$ is the $CO_2$ density at reservoir pressure and temperature; $V_g$ is the initial gas in place at the standard condition; $B_g$ is the gas formation volume factor; R is the primary condensate recovery factor; $R_{CO_2}$ is the $CO_2$ enhanced condensate recovery factor. During the gas condensate field primary production, the condensate is produced together with gas. $CO_2$ injection can help to recover the remaining condensate. The condensate recovery of $CO_2$ injection is highly dependent on the $CO_2$ and condensate miscibility at the reservoir conditions. Table 17 presents the low, mid, and high values of the recovery factor of the primary production and $CO_2$ EOR. In Arun, for example, $CO_2$ injection produces 51.31 MMbbl of condensate in the reservoir simulation. This result of 6.1% enhanced recovery factor by simulation is within the range of the published immiscible $CO_2$ enhanced condensate recovery factor in Table 17.

TABLE 17

Recovery factor for primary and $CO_2$ EOR

| Type of reservoir | Recovery factor (%) of ICIP | | |
|---|---|---|---|
| recovery | Low | Mid | High |
| Primary production | 70 | 75 | 80 |
| $CO_2$ EOR | 4.7 | 8.5 | 12.5 |

The geothermal resource in a high-temperature condensate reservoir can be calculated using the following equation:

$$Q_{th} = \rho_r \cdot V \cdot (1-\varphi) \cdot C_p (T_r - T_0)$$

where $Q_{th}$ is the geothermal resource in J; $\rho_r$ is the density of reservoir rock in kg/m³; V is the volume of the reservoir in m³; $\varphi$ is the reservoir rock porosity in fraction; $C_p$ is the mass heat capacity of the reservoir rock in J/(kg·° C.); $T_r$ is the production fluid temperature in ° C.; To is the reference temperature. As disclosed, density and heat capacity of reservoir rock are 2,800 kg/m³ and 818.8 J/(kg·° C.), respectively. A reference temperature of 60° F. (15.6° C.) is utilized.

Table 18 summarizes the $CO_2$ storage and heat mining potential for high-temperature gas condensate reservoirs in Indonesia. The composition for the gas condensate reservoir is given in Table 19. It is used to determine the gas formation volume factor in Table 18 by the Peng Robinson equation of state. The reservoirs including Senoro, Wiriagar, Gula, and Vorwata are still in the primary recovery. For these reservoirs, the amount of $CO_2$ enhanced condensate recovery and $CO_2$ storage is evaluated with $CO_2$ EOR after the primary recovery according to the primary recovery factor in Table 17. For the reservoirs including Suban and Badak, the high recovery factor in total cannot exceed 100% recovery because these two reservoirs have already achieved high recovery in the primary production.

It is understood that 4,800 MMbbl of condensate remains in the gas condensate reservoirs in Indonesia. The overall condensate recovery includes low, mid, and high values of 2,100, 2,900 and 3,700 MMbbl, respectively, by $CO_2$ injection. The total $CO_2$ storage potential in the gas condensate reservoirs in Indonesia includes low, mid, and high values of 6.6, 7.0 and 7.4 Gt, respectively. Additionally, a portion of the substantial geothermal resource of $2.06 \times 10^{19}$ J in the gas condensate reservoirs in Indonesia may be developed by $CO_2$ heat mining after the $CO_2$ EGR and $CO_2$ storage.

TABLE 18

Properties of gas condensate reservoirs in Indonesia for $CO_2$ storage and heat mining

| Reservoir | Arun | Badak | Nilam | Tunu | Senoro | Wiriagar | Suban | Gula | Vorwata | Peciko | Abadi | Total |
|---|---|---|---|---|---|---|---|---|---|---|---|---|
| Water depth (m) | 0 | <500 | 0 | 15 | 0 | <500 | 0 | <500 | <500 | 35 | <1000 | |
| IGIP (Tcf) | 13.08 | 6.78 | 5.3 | 23.85 | 3.59 | 6.08 | 5.7 | 3.2 | 14.03 | 8.23 | 18 | |
| ICIP (MMbbl) | 840 | 130 | 883 | 3975 | 598 | 1,013 | 950 | 545 | 2,338 | 1,372 | 3,000 | |
| Initial reservoir pressure (psi) | 7,115 | 2,604 | 3,743 | 4,221 | 2,900 | 4,061 | 4,380 | 2,590 | 5,900 | 3,988 | 5,610 | |
| Temperature (° F.) | 351 | 185 | 225 | 262 | 212 | 243 | 310 | 245 | 256 | 280 | 302 | |
| $CO_2$ density (kg/m$^3$) | 621 | 505 | 546 | 540 | 481 | 568 | 485 | 355 | 686 | 491 | 596 | |
| Porosity (%) | 16 | 26 | 12 | 15 | 15 | 15 | 15 | 15 | 15 | 17 | 15 | |
| Current recovery factor (%) | 87 | 98 | 80 | 77 | 59 | 50 | 90 | 0 | 41 | 89 | 76 | |
| Gas formation volume factor (ft$^3$/scf) | 0.0055 | 0.0059 | 0.0046 | 0.0044 | 0.0059 | 0.0045 | 0.004 | 0.0061 | 0.0036 | 0.0048 | 0.004 | |
| Remaining Condensate (MMbbl) | 109 | 2.60 | 177 | 914 | 245 | 507 | 95 | 545 | 1,379 | 151 | 720 | 4,800 |
| Low condensate recovery (MMbbl) | 39.5 | 2.60 | 41.5 | 186.8 | 93.9 | 250.2 | 44.7 | 407.1 | 787.9 | 64.5 | 141 | 2,100 |
| Mid condensate recovery (MMbbl) | 71.4 | 2.60 | 75.1 | 337.9 | 146.5 | 339.4 | 80.8 | 455.1 | 993.7 | 116.6 | 255 | 2,900 |
| High condensate Recovery (MMbbl) | 105 | 2.6 | 110.4 | 496.9 | 200.3 | 430.5 | 95 | 504.1 | 1204.1 | 150.9 | 375 | 3,700 |
| Low $CO_2$ storage (Gt) | 1.16 | 0.57 | 0.32 | 1.33 | 0.22 | 0.33 | 0.29 | 0.15 | 0.73 | 0.52 | 0.96 | 6.6 |
| Mid $CO_2$ storage (Gt) | 1.21 | 0.57 | 0.34 | 1.39 | 0.24 | 0.37 | 0.30 | 0.17 | 0.81 | 0.54 | 1.01 | 7.0 |
| High $CO_2$ storage (Gt) | 1.26 | 0.57 | 0.35 | 1.45 | 0.27 | 0.41 | 0.30 | 0.19 | 0.90 | 0.55 | 1.10 | 7.4 |
| Geothermal resource ($10^{18} \times J_{th}$) | 3.96 | 0.52 | 1.07 | 4.38 | 0.66 | 1.03 | 1.16 | 0.76 | 2.02 | 1.54 | 3.49 | 20.6 |

TABLE 19

Gas composition of gas condensate reservoirs in Indonesia

| Reservoir | Arun | Badak | Nilam | Tunu | Senoro | Wiriagar | Suban | Gula | Vorwata | Peciko | Abadi |
|---|---|---|---|---|---|---|---|---|---|---|---|
| $CO_2$ (%) | 13.76 | 4.42 | 6.54 | 5.51 | 1.08 | 10 | 5 | 13.30 | 12 | 32.0 | 9.29 |
| $H_2S$ (%) | 0 | 0 | 0 | 0 | 0.00 | 0 | 0 | 0.00 | 0 | 0.5 | 0.00 |
| $N_2$ (%) | 0.32 | 0 | 0 | 0 | 0.91 | 0 | 0 | 0.75 | 0 | 0 | 0.93 |
| $H_2O$ (%) | 5.90 | 0 | 0 | 0 | 0.00 | 0 | 0 | 0.00 | 0 | 0 | 0.00 |
| $C_1$ (%) | 67.3 | 82.8 | 77.55 | 75.9 | 84.87 | 88 | | 83.41 | 78 | | 81.49 |
| $C_2$ (%) | | 3.87 | 7.18 | 5.7 | 5.11 | | | 1.62 | | | 4.29 |
| $C_3$ (%) | | 3.7 | 4.18 | 5.48 | 2.97 | | | 0.36 | | | 1.51 |
| $iC_4$ (%) | | 0.99 | 0.87 | 1.21 | 0.93 | | | 0.07 | | | 0.30 |
| $nC_4$ (%) | 12.7 | 1.03 | 1 | 1.45 | 1.10 | 2 | 95 | 0.09 | 10 | 67.5 | 0.14 |
| $iC_5$ (%) | | 0.52 | 0.38 | 0.61 | 0.59 | | | 0.04 | | | 0.19 |
| $nC_5$ (%) | | 0.29 | 0.23 | 0.39 | 0.47 | | | 0.03 | | | 0.16 |
| $C_6$ (%) | | 0.4 | 0.15 | 0.33 | 0.57 | | | 0.02 | | | 0.23 |
| $C_{7+}$ (%) | | 1.98 | 1.92 | 3.45 | 1.40 | | | 0.31 | | | 1.47 |
| Total (%) | 100 | 100 | 100 | 100 | 100 | 100 | 100 | 100 | 100 | 100 | 100 |

Figure 21:
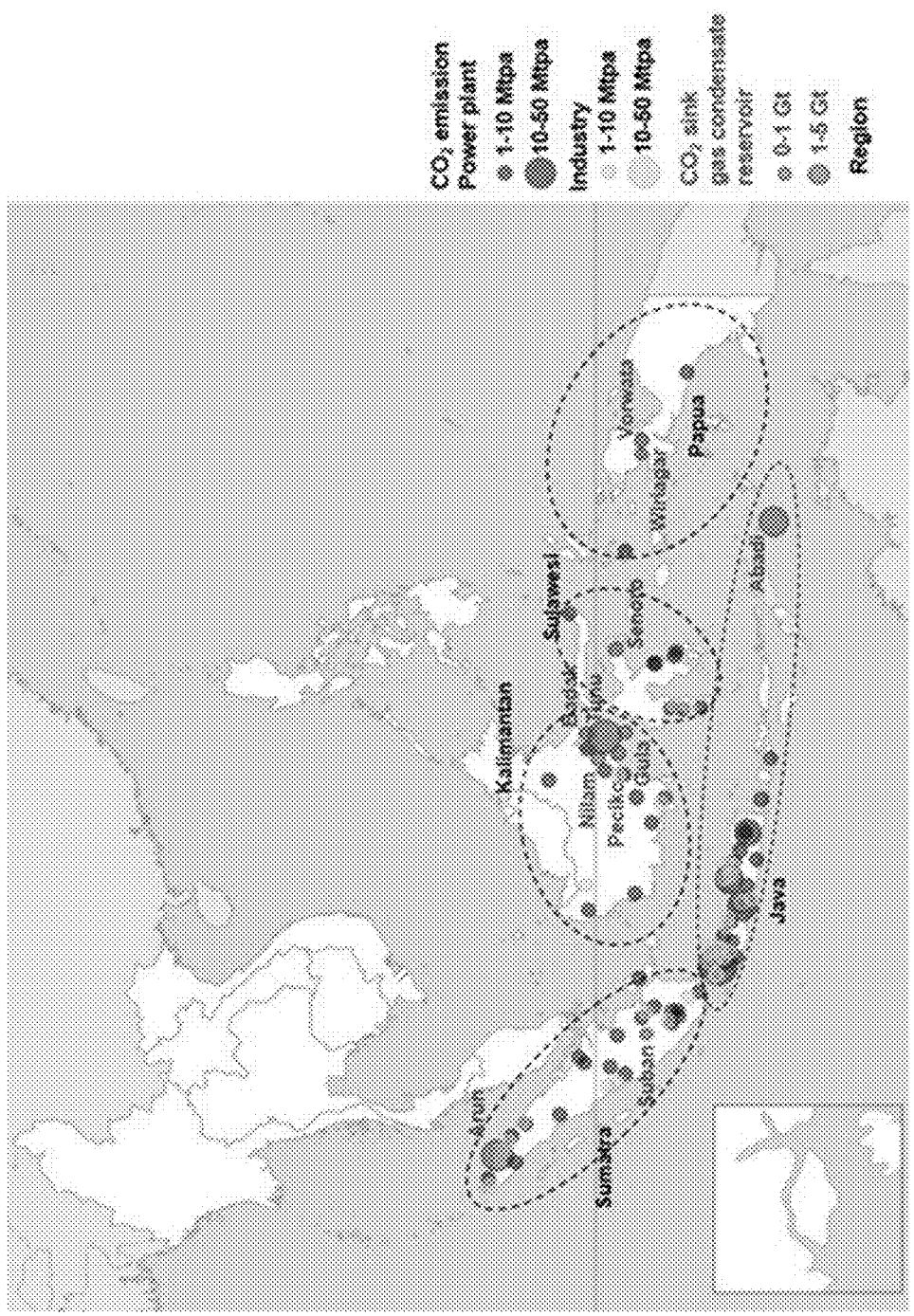
FIG. 21 displays a map of five Indonesian regions including $CO_2$ sources from power plants and industries and $CO_2$ storage in gas condensate reservoirs, in accordance with embodiments.

A bubble map of $CO_2$ emissions from power plants and industries, mid $CO_2$ storage capacity in gas condensate reservoirs in Indonesia is given in FIG. 21. The $CO_2$ emissions from power plants is plotted as dark grey circles, from industries by light grey circles. $CO_2$ storage capacity in gas condensate reservoir is represented by medium grey circles. Five regions including Sumatra, Kalimantan, Sulawesi, Papua, and Java are defined in the source and sink mapping in FIG. 21. A comparison of $CO_2$ emissions from power plants and industries, mid $CO_2$ storage capacity (Table 18) in the gas condensate reservoirs in Indonesia is presented in Table 20.

In the region of Sumatra, there is 1.5 Gt of mid $CO_2$ storage capacity. This includes Arun with 1.2 Gt (Table 18) of mid $CO_2$ storage capacity and Suban with 0.3 Gt (Table 18) of mid $CO_2$ storage capacity. The $CO_2$ emissions from power plants and industries total 81.8 Mtpa (Table 20) in this region, including 45.9 Mtpa (Table 20) of $CO_2$ emission from power plants and industries with distances of less than 500 km to the Arun and Suban reservoir, 35.9 Mtpa (Table 20) of $CO_2$ emissions with distances larger than 500 km to either Arun or Suban reservoirs. Research by the Intergovernmental Panel on Climate Change (IPCC) shows that 30-60% of $CO_2$ emissions from power plants and industries is technically suitable for capture. 36.8 Mtpa of 81.8 Mtpa (Table 20) is capturable in this region when 45% of $CO_2$ emissions from power plants and industries is assumed to be captured. When the 1.5 Gt of mid $CO_2$ storage capacity is divided by the 36.8 Mtpa of $CO_2$ emissions from power plants and industries in this region, 40.7 years (Table 20) of $CO_2$ emissions from power plants and industries can be stored.

Similar calculations give 328 years, 23.7 years, and 386.5 years of storage for $CO_2$ emissions from power plants and industries in Kalimantan, Sulawesi, and Papua, respectively. In the region of Java, there is no gas condensate reservoirs for $CO_2$ storage. However, this region has the largest $CO_2$ emission of 196.1 Mtpa (Table 20) from power plants and industries in Indonesia [105]. The $CO_2$ sources of 88.2 Mtpa (Table 20) from Java can be captured and transported to Abadi by marine vessels for storage. In such a case our calculations give 11.4 years (Table 20) of storage for $CO_2$ emission from power plants and industries in Java.

For the whole country of Indonesia, there is 7.0 Gt (Table 18) of mid $CO_2$ storage capacity from all the gas condensate reservoirs. In total, 347.1 Mtpa (Table 20) of $CO_2$ emission from power plants and industries is available and 45% or 156.2 Mtpa (Table 20) is assumed to be capturable in Indonesia. This is equal to 25% of the total $CO_2$ emission of 617.5 Mtpa in 2019 in Indonesia. This assumption is consistent with the result of an IPCC study shows that 20-40% of anthropogenic $CO_2$ emission worldwide is suitable for capture. When 7.0 Gt (Table 18) of mid $CO_2$ storage capacity is divided by 156.2 Mtpa (Table 20) of $CO_2$ emissions from power plants and industries, 45 years (Table 20) of $CO_2$ emissions can be stored. This is in addition to significant amount of condensate production and potential of geothermal heat mining by $CO_2$ injection mentioned earlier. Other sinks may include dry gas, oil reservoirs, and saline aquifers.

TABLE 20

$CO_2$ source from power plants and industries and $CO_2$ storage in gas condensate reservoirs in Indonesia

| Region | Gas condensate reservoirs | Mid $CO_2$ storage capacity (Gt) | $CO_2$ emission from power plants and industries with distance <500 km from any sinks (Mtpa) | $CO_2$ emission from power plants and industries with distance >500 km from all sinks (Mtpa) | Total $CO_2$ emission from power plants and industries (Mtpa) | $CO_2$ emission captured at 45% of total (Mtpa) | Years of captured $CO_2$ emission that can be stored (years) |
|---|---|---|---|---|---|---|---|
| Sumatra | Arun | 1.5 | 45.9 | 35.9 | 81.8 | 36.8 | 40.7 |
|  | Suban |  |  |  |  |  |  |
| Kalimantan | Nilam | 3.0 | 7.5 | 12.9 | 20.3 | 9.1 | 328.1 |
|  | Peciko |  |  |  |  |  |  |
|  | Badak |  |  |  |  |  |  |
|  | Tunu |  |  |  |  |  |  |
|  | Gula |  |  |  |  |  |  |
| Sulawesi | Senoro | 0.2 | 6.1 | 16.4 | 22.5 | 10.1 | 23.7 |
| Papua | Wiriagar | 1.2 | 4.9 | 2.0 | 6.9 | 3.1 | 386.5 |
|  | Vorwata |  |  |  |  |  |  |
| Java | Abadi | 1.0 | 0.0 | 196.1 | 196.1 | 88.2 | 11.4 |
| The whole country |  | 7.0 | 64.3 | 282.8 | 347.1 | 156.2 | 44.8 |

CONCLUSIONS

In this study, reservoir simulations are performed to investigate the potential of $CO_2$ EGR, $CO_2$ storage, and heat mining in the depleted high temperature Arun gas condensate reservoir. The following can be concluded:

1. $CO_2$ injection in the depleted high-temperature Arun gas condensate reservoir can produce 47% or 51.31 MMbbl of the remaining condensate.
2. The total $CO_2$ storage capacity from replacement of volume left behind by produced gas and condensate is 1.2 Gt when the depleted reservoir pressure builds up to the initial reservoir pressure.
3. The condensate production can generate a NPV of $1,910 MM at an oil price of $60/bbl and a $CO_2$ price of $30/ton.
4. This profit can be used to finance 205 Mt of $CO_2$ storage, which is achievable in two years after condensate recovery at a NPV of zero.
5. Alternatively, it can be used to generate $1.1 \times 10^{10}$ kWh of geothermal electricity at zero NPV in seven years, under the conditions studied.
6. $CO_2$ storage in the Arun reservoir prior to the $CO_2$ heat mining helps to build up reservoir pressure and a larger amount of heat can be mined when compared to the case without $CO_2$ storage first.
7. When the cost of $CO_2$ is −$30/ton, 1.2 Gt of $CO_2$ stored can generate a NPV of $1.7×10^{10}$.
8. The disclosure presents a reference case for utilization of high-temperature gas condensate reservoirs in Indonesia. Currently 4,800 MMbbl of condensate remain in gas condensate reservoirs in Indonesia. The overall condensate recovery by $CO_2$ injection has low, mid and high values of 2,100, 2,900 and 3,700 MMbbl, respectively, based on best estimates of condensate recovery factors by $CO_2$ injection. The resulting $CO_2$ storage capacity has low, mid and high values of 6.6, 7.0 and 7.4 Gt, respectively.
9. There is 7.0 Gt of mid $CO_2$ storage capacity from all of the gas condensate reservoirs. If 45% or 156.2 Mtpa of the total of $CO_2$ emission from power plants and industries is assumed to be capturable in Indonesia, the gas condensate reservoirs have enough capacity to store 45 years of $CO_2$ emission in Indonesia. When the $CO_2$ sources from power plants, industries, and sinks in gas condensate reservoirs are mapped by region, the gas condensate reservoirs can store $CO_2$ emissions for 41 years in Sumatra, 328 years in Kalimantan, 24 years in Sulawesi, 387 years in Papua, and 11 years in Java.
10. A significant portion of the geothermal resource of $2.06×10^{19}$ J in the gas condensate reservoirs in Indonesia may be developed by $CO_2$ heat mining after the $CO_2$ EGR and $CO_2$ storage.

It is noted that $CO_2$ injection into the depleted Arun reservoir can produce 51 MMbbl of condensate over a period of 16 years. Afterwards, continuous $CO_2$ injection without any production can allow 1.2 Gt of $CO_2$ to be stored over a 20 year period by raising the reservoir pressure to the initial value. Additionally, subsequent recycling of $CO_2$ can produce substantial amounts of geothermal energy for electricity production.

Nomenclature $CO_2$-EGR—$CO_2$ enhanced gas recovery
CCS—Carbon capture and storage
EGR—Enhanced gas recovery
EOR—Enhanced oil recovery
Gt—billion ton
ICIP—Initial condensate in place
IGIP—Initial gas in place
Mt—Million ton
Mtpa—Million ton per annum
NPV—Net present value
RMSE—Root mean squared error
$R^2$—Coefficient of determination
Cheat mining—heat mined in J
$\rho_{CO_2}$—density of $CO_2$ at the surface condition in kg/m³
$V_{CO_2}$—volume of the $CO_2$ production in Sm³
$C_{CO_2}$—heat capacity of the $CO_2$ in J/(kg·°C.)
$T_{wellhead}$—production fluid temperature at the wellhead in °C.
$T_0$—reference temperature in °C.
$m_{CO_2}$—mass of the $CO_2$ storage in tons
$V_g$—initial gas in place at the standard condition in m³
$B_g$—gas formation volume factor in ft³/scf
R—condensate recovery factor in %
$R_{CO_2}$—$CO_2$ enhanced condensate recovery factor in %
$Q_{th}$—geothermal resource in J
$\rho_r$—density of reservoir rock in kg/m³
V—volume of the reservoir in m³
$\varphi$—reservoir rock porosity in fraction
$C_p$—mass heat capacity of the reservoir rock in J/(kg·°C.)
$T_r$—reservoir fluid temperature in °C.
n—Number of samples
$Y_i^{simulation}$—Simulation data
$Y_i^{actual}$—Actual field data
$\overline{Y_i^{actual}}$—Average actual field data
$S_c$—Sale price of condensate in $/bbl
$Q_c$—Quantity of the sale condensate in bbl
$Q_r$—Local authority royalty in %
$S_e$—Sale price of electricity in $/kWh
$Q_h$—Quantity of the heat mining in MMbtu
$E_h$—Efficiency from geothermal to electricity in %
$C_p$—Cost of geothermal power plant in $
$Q_{CO_2}$—Quantity of $CO_2$ sequestration in ton
$C_{CO_2}$—Unit cost of the $CO_2$ which include carbon tax in $/ton
$N_{well}$—Number of wells in the field
$C_{well}$—Operation cost in $/well
$C_p$—Variable cost for each well due to well service and failure in %

A plurality of additional features and feature refinements are applicable to specific embodiments. These additional features and feature refinements may be used individually or in any combination. It is noted that each of the following features discussed may be, but are not necessary to be, used with any other feature or combination of features of any of the embodiments presented herein.

Unless otherwise defined, all technical and scientific terms used herein have the same meanings as are commonly understood by one of ordinary skill in the art to which this disclosure belongs. Although methods similar or equivalent to those described herein can be used in the practice or testing of the present disclosure, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present disclosure is not limited to what has been particularly shown and described hereinabove. Rather, the scope of the present disclosure is defined by the appended claims and includes both combinations and sub-combinations of the various features described hereinabove as well as variations and modifications thereof, which would occur to persons skilled in the art upon reading the foregoing description.

We claim:
1. A method for storing carbon dioxide, comprising:
first identifying a gas condensate reservoir including a plurality of injection wells and a plurality of production wells;
then at least partially depleting the reservoir; wherein during the depleting, the reservoir pressure is decreasing;
then performing enhanced recovery of gas condensate on the reservoir, wherein during the performing, a first quantity of carbon dioxide is injected into the plurality of injection wells of the reservoir for expulsion of the gas condensate left in the reservoir;
then performing carbon dioxide heat mining, wherein during the heat mining, a second quantity of carbon dioxide is injected by a plurality of injection wells into the reservoir and both of the first and second quantities of carbon dioxide are subsequently produced to the surface from the reservoir for capture and conversion of geothermal energy of the first and second quantities of carbon dioxide into electricity; and then storing a third quantity of carbon dioxide in the reservoir, wherein during the storing, all of the plurality of production wells are shut-in and the first, second, and third quantities of carbon dioxide are injected into the reservoir for permanent storage.

2. The method of claim 1, wherein the reservoir comprises a plurality of horizontal zones each defined at a specific depth and each having a specific horizontal permeability.

3. The method of claim 2, wherein one of the plurality of horizontal zones at a second depth range comprises a greatest horizontal permeability.

4. The method of claim 1, further comprising, during the heat mining, reinjecting the first quantity of carbon dioxide and producing the first quantity of carbon dioxide over a period of time.

5. The method of claim 1, further comprising setting a bottomhole pressure limit of each of the plurality of injection wells to the initial reservoir pressure when storing the third quantity of carbon dioxide.

6. The method of claim 1, further comprising reducing a carbon dioxide injection rate during at least a portion of the performing of the enhanced recovery of gas condensate.

7. A method for storing carbon dioxide, comprising:
first providing an at least partially depleted gas condensate reservoir including a plurality of injection wells and a plurality of production wells;
then performing enhanced gas recovery, wherein a first quantity of carbon dioxide is injected into the depleted gas condensate reservoir for expulsion of gas condensate existing in the reservoir;
then performing heat mining, wherein a second quantity of carbon dioxide is injected into the reservoir and the first and second quantities of carbon dioxide are subsequently produced from the reservoir for geothermal heat capture and conversion of geothermal heat of the first and second quantities of carbon dioxide into electricity; and
then performing carbon dioxide storage, wherein at least the first quantity of carbon dioxide is injected into the reservoir until a pressure of the depleted gas condensate reservoir reaches the initial reservoir pressure; and
determining the net present value of performing the enhanced gas recovery, the heat mining, and the carbon dioxide storage.

8. The method of claim 7, further comprising setting a bottomhole pressure limit of each of the plurality of injection wells to the initial reservoir pressure when performing carbon dioxide storage.

* * * * *